US011425569B2

(12) United States Patent
Akkad et al.

(10) Patent No.: US 11,425,569 B2
(45) Date of Patent: *Aug. 23, 2022

(54) SECURE COMMUNICATION IN MOBILE DIGITAL PAGES

(71) Applicant: Google LLC, Mountain View, CA (US)

(72) Inventors: Jay Akkad, Palo Alto, CA (US); Nikhil Rao, Santa Clara, CA (US); Anshul Gupta, San Francisco, CA (US); David Wang, San Carlos, CA (US); Ian Baker, Mountain View, CA (US)

(73) Assignee: GOOGLE LLC, Mountain View, CA (US)

( * ) Notice: Subject to any disclaimer, the term of this patent is extended or adjusted under 35 U.S.C. 154(b) by 250 days.

This patent is subject to a terminal disclaimer.

(21) Appl. No.: 16/901,560

(22) Filed: Jun. 15, 2020

(65) Prior Publication Data

US 2020/0356611 A1 Nov. 12, 2020

Related U.S. Application Data

(63) Continuation of application No. 16/466,203, filed as application No. PCT/US2019/030811 on May 6, 2019, now Pat. No. 11,166,155.

(51) Int. Cl.
*H04L 29/06* (2006.01)
*H04W 12/30* (2021.01)
(Continued)

(52) U.S. Cl.
CPC .............. *H04W 12/35* (2021.01); *G06F 9/54* (2013.01); *G06F 9/541* (2013.01);
(Continued)

(58) Field of Classification Search
CPC ..... H04W 12/35; H04W 12/03; H04W 12/08; G06F 9/54; G06F 9/541; G06F 16/1865;
(Continued)

(56) References Cited

U.S. PATENT DOCUMENTS 7,509,573 B1 3/2009 Jones et al.
9,740,672 B2 * 8/2017 Ross ....................... G06F 40/14
(Continued)

OTHER PUBLICATIONS

Telikicherla, Krishna Chaitanya, and Venkatesh Choppella. "Enabling the development of safer mashups for open data." Proceedings of the 1st International Workshop on Inclusive Web Programming—Programming on the Web with Open Data for Societal Applications. 2014. (Year: 2014).*

(Continued)

*Primary Examiner* — Joseph P Hirl
*Assistant Examiner* — Ka Shan Choy
(74) *Attorney, Agent, or Firm* — Dority & Manning, P.A.

(57) ABSTRACT

Secure communication in mobile digital pages is provided. The system receives an electronic document and validates the electronic document for storage in a cache server. The system receives a request for the electronic document and provides it to a viewer component on a client computing device. The viewer component loads the electronic document in an iframe. The viewer component executes a runtime component to receive, via a secure communication channel, a tag from the electronic document. The system receives the tag and selects a data value for transmission to the viewer component. The viewer components provides the data value to cause the runtime component to execute an action with the data value.

20 Claims, 4 Drawing Sheets

(51) Int. Cl.

| | | |
|---|---|---|
| *H04W 12/08* | (2021.01) | |
| *G06F 16/958* | (2019.01) | |
| *G06F 16/957* | (2019.01) | |
| *G06F 16/18* | (2019.01) | |
| *G06F 40/226* | (2020.01) | |
| *G06F 9/54* | (2006.01) | |
| *G06F 21/62* | (2013.01) | |
| *H04L 67/02* | (2022.01) | |
| *H04L 67/01* | (2022.01) | |
| *G06F 16/22* | (2019.01) | |
| *H04W 12/03* | (2021.01) | |
| *G06F 21/64* | (2013.01) | |
| *H04L 9/40* | (2022.01) | |
| *H04L 67/568* | (2022.01) | |

(52) U.S. Cl.
CPC .......... *G06F 16/1865* (2019.01); *G06F 16/22* (2019.01); *G06F 16/957* (2019.01); *G06F 16/958* (2019.01); *G06F 21/6209* (2013.01); *G06F 21/6218* (2013.01); *G06F 21/64* (2013.01); *G06F 40/226* (2020.01); *H04L 63/0281* (2013.01); *H04L 67/02* (2013.01); *H04L 67/42* (2013.01); *H04W 12/03* (2021.01); *H04W 12/08* (2013.01); *H04L 67/2842* (2013.01)

(58) Field of Classification Search
CPC ...... G06F 16/22; G06F 16/957; G06F 16/958; G06F 21/6209; G06F 21/6218; G06F 21/64; G06F 40/226; G06F 40/143; G06F 40/154; H04L 63/0281; H04L 67/02; H04L 67/42; H04L 67/2842; G06Q 10/10; G06Q 30/06; G06Q 40/02
See application file for complete search history.

(56) References Cited

U.S. PATENT DOCUMENTS

| | | | |
|---|---|---|---|
| 9,826,060 B1* | 11/2017 | Johansson | .......... G06Q 30/0635 |
| 2003/0097591 A1 | 5/2003 | Pham et al. | |
| 2014/0006347 A1* | 1/2014 | Qureshi | ................ H04L 9/0822 |
| | | | 707/621 |
| 2014/0373177 A1* | 12/2014 | Arning | .................. G06F 16/335 |
| | | | 726/28 |
| 2015/0047051 A1* | 2/2015 | Johns | .................... H04W 12/08 |
| | | | 726/27 |
| 2019/0238547 A1* | 8/2019 | Milden | .................. G06N 20/00 |

OTHER PUBLICATIONS

"The World's Most Accurate Autofill for Mobile Browsers: A Fillr Technical Whitepaper", Fillr, Dec. 2017, retrieved Jun. 28, 2019 from URL: https://web.archive.org/web/20180705142038if_/https://static1.squarespace.com/static/54cb10c3e4b0a44a770927e8/t/597e8c36d482e9f4cc7f4da1/1501465667278/Tech_Whitepaper.pdf (8 pages).

Araujo et al., "Carbon: Domain-Independent Automatic Web Form Filling", International Conference on Financial Cryptography and Data Security, Lecture Notes in Computer Science, Jul. 5, 2010, pp. 292-306 (15 pages).

International Search Report and Written Opinion for PCT Appln. Ser. No. PCT/US2019/030811 dated Jan. 14, 200 (18 pages).

* cited by examiner

SECURE COMMUNICATION IN MOBILE DIGITAL PAGES

CROSS-REFERENCES TO RELATED APPLICATIONS

This application claims the benefit of priority under 35 U.S.C. § 120 as a continuation of U.S. patent application Ser. No. 16/466,203, filed Jun. 3, 2019, which is a U.S. National Stage application is a U.S. National Stage under 35 U.S.C. § 371 of International Patent Application No. PCT/US2019/030811, filed on May 6, 2019 and designating the United States, each of which is hereby incorporated by reference herein in its entirety.

BACKGROUND

Applications can be installed on a computing device. The computing device can execute the application. The application can present digital content.

SUMMARY

At least one aspect is directed to a system for secure communication in mobile digital pages, electronic documents or other electronic resources. The system can include a data processing system having one or more processors and memory. The data processing system can include or execute a validation component. The validation component can receive, from a third party developer device, an electronic document configured to interface with a runtime application programming interface. The validation component can validate the electronic document based on a validation policy. The validation component can store, responsive to validation of the electronic document, the electronic document on a cache server of the data processing system. The cache server can receive, from a viewer component executed by a client computing device, a request to access the electronic document. The cache server can provide, responsive to the request, the electronic document to the viewer component to cause the viewer component to perform one or more action or functions. The viewer component can load, in an iframe, the electronic document for display via the client computing device. The viewer component can execute, in the electronic document, a runtime component to identify a tag coded with a markup language in the electronic document. The viewer component can receive, from the runtime component via a secure communication channel, an indication of the tag. The data processing system can receive, from the viewer component, the indication of the tag. The data processing system can select, based on the indication of the tag, a data value. The data processing system can transmit, to the viewer component executed by the client computing device. The data value to cause the viewer component to perform one or more actions or function. The viewer component can generate a prompt comprising the data value. The viewer component can receive, responsive to the prompt, input from the client computing device. The viewer component can provide, via the secure communication channel and responsive to the input, the data value to the runtime component to cause the runtime component to execute an action with the data value via the electronic document. The secure communication channel can be private as it may not include the third-party developer.

The data processing system can parse the electronic document responsive to receipt of the electronic document from the third party developer device. The data processing system can determine, based on parsing the electronic document, that JavaScript is absent from the electronic document. The data processing system can validate, responsive to the determination that JavaScript is absent from the electronic document, the electronic document for storage in the cache server of the data processing system.

The data processing system can receive a second electronic document. The data processing system can detect a presence of JavaScript in the second electronic document responsive to receipt of the second electronic document. The data processing system can determine, responsive to detection of the presence of the JavaScript in the second electronic document, not to validate the second electronic document and remove the second electronic document from storage in the cache server.

The data processing system can identify the markup language in the electronic document responsive to receipt of the electronic document from the third party developer device. The data processing system can determine, based on a format of the markup language, that the electronic document is valid for secure communication in mobile digital pages. The data processing system can store, in the cache server, the electronic document responsive to validation of the electronic document for secure communication in mobile digital pages.

The cache server can include a proxy server for a server of the third party developer device that provided the electronic document. The cache server can intercept a request to access the electronic document. The cache server can perform a lookup in storage of the cache server to determine that the electronic document has been validated and stored in the cache server. The cache server can retrieve, from storage in the cache server, the electronic document instead of accessing a server of the third party developer device that provided the electronic document. The cache server can transmit, from storage of the cache server, the electronic document to the viewer component executed by the client computing device.

The data processing system can receive, from the viewer component interfacing with the runtime component via the secure communication channel, the indication of the tag. The data processing system can retrieve, responsive to the tag, the data value from an account associated with the client computing device stored on the data processing system. The data processing system can provide, to the viewer component, the data value to cause the viewer component to generate the prompt including the data value.

The data processing system can identify the data value responsive to receipt of the indication of the tag from the viewer component, the data value associated with the client computing device and stored on the data processing system. The data processing system can provide the data value to the viewer component to cause the viewer component to display, in an overlay, the prompt generated to include the data value.

The data processing system can identify a plurality of candidate data values responsive to receipt of the indication of the tag from the viewer component. The data processing system can provide the plurality of candidate data values for display in the prompt, wherein the prompt restricts access by the electronic document to at least one of the plurality of candidate data values. The viewer component can block access to the data value by the electronic document prior to the input from the client computing device.

The data processing system can search one or more electronic data sources associated with the client computing device to identify the data value responsive to the indication of the tag. The input can include an instruction from the client computing device to grant the electronic document access to the data value provided by the data processing system responsive to the indication of the tag. The action can include an electronic transaction using the data value.

At least one aspect is directed to a method of secure communication in mobile digital pages. The method can be performed by a data processing system having a processor and memory. The method can include the data processing system receiving, from a third party developer device, an electronic document configured to interface with a runtime application programming interface. The method can include the data processing system validating the electronic document based on a validation policy. The method can include the data processing system storing, responsive to validation of the electronic document, the electronic document on a cache server of the data processing system. The method can include a cache server receiving, from a viewer component executed by a client computing device, a request to access the electronic document. The method can include the cache server providing, responsive to the request, the electronic document to cause the viewer component to: load, in an iframe, the electronic document for display via the client computing device; execute, in the electronic document, a runtime component to identify a tag coded with a markup language in the electronic document; and receive, from the runtime component via a secure communication channel, an indication of the tag. The method can include the data processing system receiving, from the viewer component, the indication of the tag. The method can include the data processing system selecting, based on the indication of the tag, a data value. The method can include the data processing system transmitting, to the viewer component executed by the client computing device, the data value to cause the viewer component to: generate a prompt comprising the data value; receive, responsive to the prompt, input from the client computing device; and provide, via the secure communication channel and responsive to the input, the data value to the runtime component to cause the runtime component to execute an action with the data value via the electronic document.

At least one aspect is directed to a computer program product that, when implemented on a data processing system, is configured to cause the data processing system to perform the method of secure communications in mobile digital pages.

The individual features and/or combinations of features defined above in accordance with any aspect of this disclosure or below in relation to any specific embodiment of the disclosure may be utilized, either separately and individually, alone or in combination with any other defined feature, in any other aspect or embodiment of the disclosure.

Furthermore, the this disclosure is intended to cover apparatus configured to perform any feature described herein in relation to a method and/or a method of using or producing, using or manufacturing any apparatus feature described herein.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
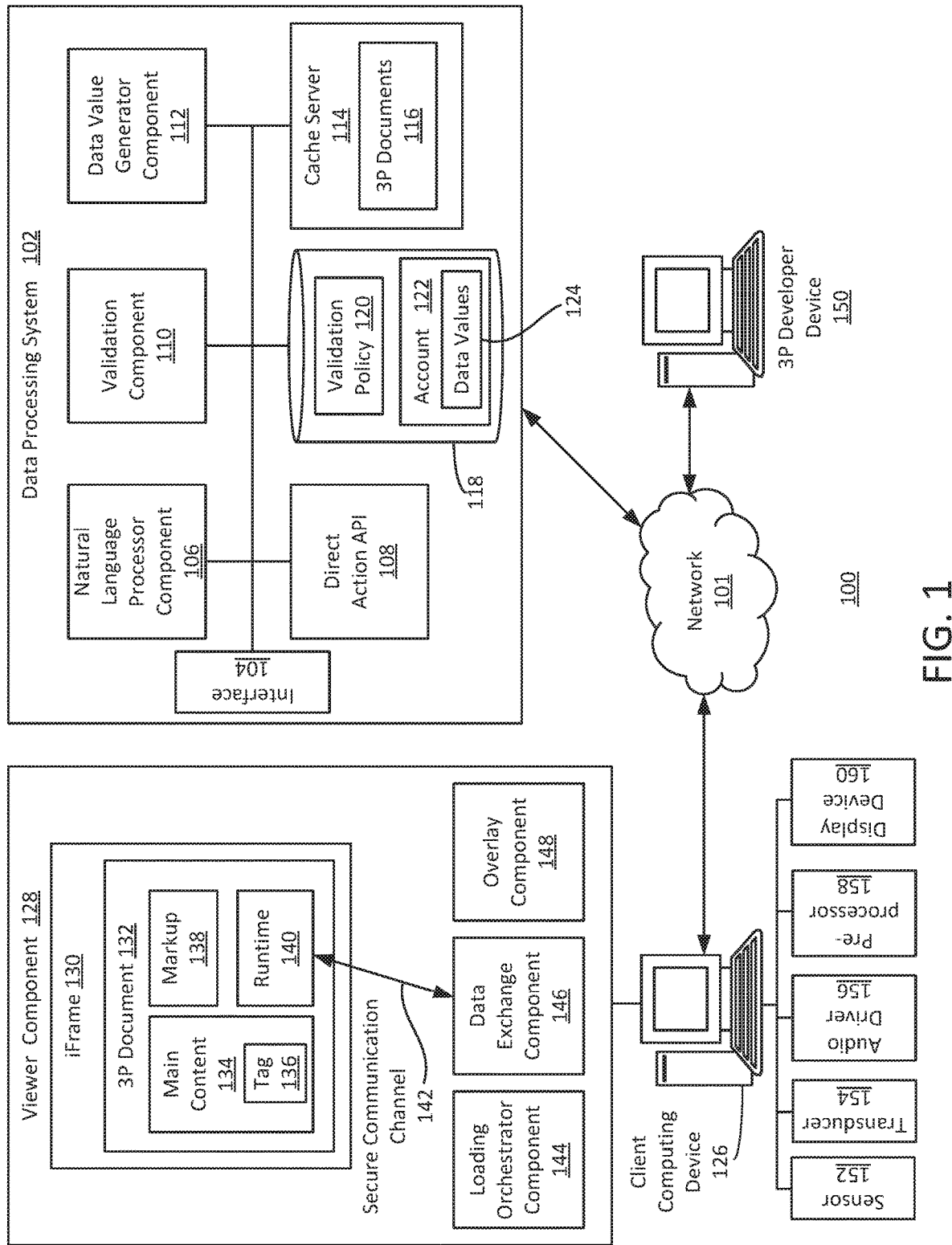
FIG. 1 is an illustration of an example system for secure communication in mobile digital pages.

Following below are more detailed descriptions of various concepts related to, and implementations of, methods, apparatuses, and systems for secure communication in mobile digital pages. The various concepts introduced above and discussed in greater detail below may be implemented in any of numerous ways.

This disclosure is generally directed to providing secure communication in mobile digital pages, electronic documents or electronic resources. The secure communication can allow data transfer between a mobile digital page and a server and can, for example, allow for input to be provided to the mobile digital page so as to provide improved user input. Electronic resources can refer to a web page or other online document or electronic document that can be rendered or otherwise presented on a computing device. A mobile digital page can refer to an electronic resource such as a web page designed, constructed or configured for display on a mobile computing device or mobile operating system, such as a smartphone, tablet device, smartwatch, smart television, smart speaker or other computing device. A mobile digital page can include, use or be associated with one or more components, such as hypertext markup language ("HTML") with web components, a script (e.g., JavaScript) to manage resource loading, and a cache to serve and validate the mobile page. A web component can refer to a set of features that provide a standard component model for the internet that allows for encapsulation and interoperability of individual HTML elements. The mobile digital page can be developed and provided by a third-party developer.

A client computing device can render the mobile digital page. The mobile digital page can include input fields or provide prompts for input. The input can be provided by a user of the mobile digital page. The input can include information associated with the user, such as a username, password, account information, electronic transaction information, or preference information. However, the user may not have access to the data to be provided for input to the mobile device. Further, the client computing device may have a limited user interface or input capabilities to receive input from a user. The mobile digital page may not have the ability to provide a suggestion for the input. The mobile digital page may operate in a sandboxed or restricted computing environment in which the mobile digital page is prevented from accessing parts of memory on the client computing device, or a server containing account information. As mobile digital pages are increasingly accessed or rendered on client computing devices, and third party developers increasingly request input data values to execute actions or perform services, it can be challenging to provide such input for mobile digital pages while maintaining a secure communication channel due to the limited input interfaces on mobile devices, inefficiencies associated with providing input via the limited input interfaces, or the inability to readily access the input information.

The technical solution of this disclosure is directed to providing a secure communication in mobile web pages that allows for a secure data exchange between account information and an electronic resource, such as the mobile web page. The technical solution can provide capabilities such as identification, electronic transaction processing, customization, or contextual information to third party mobile pages or electronic documents to improve the processing flow while maintaining security throughout the system. The secure communication can be secure because the data provided via the secure communication cannot be accessed by the third party developer, thereby improving security and privacy. Thus, the third party developer cannot gain access to the secure communication channel.

Systems and methods of this technical solution include a runtime component, a cache server, and a viewer component. Third party developers can use the system to build electronic documents based on an application programming interface associated with the runtime component. The cache server can store the electronic document developed by the third party developer. When the document is requested for display on a client computing device, the viewer component can execute on the client computing device to load the electronic document from cache of the cache server. The viewer component can host the runtime which can be used to obtain identification information, trigger electronic transaction processing, and autofill data values approved by the user. The cache server can provide validation of the third party document contents for safe usage and caching or e-hosting for performance benefits. The viewer component can receive or obtain account data from external sources (e.g., identity data, transaction account info, or other contextual personalization data. The viewer component can provide an overlay user interface to allow the user to select/manipulate information and grant usage of the info to the third party electronic document. The viewer component can accept data from the third party electronic document (e.g., via the runtime API) to be saved back to the account information. The viewer component can orchestrate the loading of third party electronic documents. The viewer component and the runtime can be isolated from each other and communicate over a secure communication channel, thereby restricting or controlling any data exchange from the third party document. The runtime can provide data to the third party document upon approval.

The developer can use a markup language to encode tags within third party documents. The tags can indicate contextual information about the web page. The runtime component can parse the tags to determine the contextual information, and forward the contextual information to the viewer component for forwarding to a data processing system or external sources. Based on the tags, the data processing system can access account information to provide data values. Thus, systems and methods of this technical solution can securely provide data values for efficient input into mobile pages rendered by computing devices with limited input or output interfaces. The data values may be associated with a user and may be provided as input by the user and stored for subsequent input into the mobile pages. The subsequent input into the mobile pages may be automatic or may be in a manner that assists the user in providing the input. A mechanism enabling user input that provides a shortcut for a user to input stored data may therefore be provided. The secure provision of such data values can reduce processor, memory or battery consumption of the computing device by reducing the amount of delay caused by inputting data values or launching additional applications on the computing device to obtain the data values.

FIG. 1 illustrates an example system 100 for secure communication in mobile digital pages. The system 100 can include content selection infrastructure. The system 100 can include application delivery infrastructure. The system 100 can include an online application store or marketplace. The system 100 can include a data processing system 102. The data processing system 102 can communicate with one or more of an third-party ("3P") developer device 150 (or application developer device) or a client computing device 126 (or client device or computing device) via network 101. The system 100 can also communicate with other devices, such as third-party devices, content provider devices, or digital surface devices.

The network 101 can include computer networks such as the Internet, local, wide, metro, or other area networks, intranets, satellite networks, and other communication networks such as voice or data mobile telephone networks. The network 101 can be used to access information resources such as web pages, web sites, domain names, or uniform resource locators that can be presented, output, rendered, or displayed on at least one client computing device 126, such as a laptop, desktop, tablet, digital assistant device, smart phone, wearable device, portable computers, or speaker. For example, via the network 101 a user of the client computing device 126 can access information or data provided by the data processing system 102 or 3P developer device 150.

The network 101 can include or constitute a display network, e.g., a subset of information resources available on the internet that are associated with a content placement or search engine results system, or that are eligible to include third party digital components as part of a digital component placement campaign. The network 101 can be used by the data processing system 102 to access information resources such as web pages, web sites, domain names, or uniform resource locators that can be presented, output, rendered, or displayed by the client computing device 126. For example, via the network 101 a user of the client computing device 126 can access information or data provided by the data processing system 102 or the 3P developer device 150.

The network 101 may be any type or form of network and may include any of the following: a point-to-point network, a broadcast network, a wide area network, a local area network, a telecommunications network, a data communication network, a computer network, an ATM (Asynchronous Transfer Mode) network, a SONET (Synchronous Optical Network) network, a SDH (Synchronous Digital Hierarchy) network, a wireless network and a wireline network. The network 101 may include a wireless link, such as an infrared channel or satellite band. The topology of the network 101 may include a bus, star, or ring network topology. The network may include mobile telephone networks using any protocol or protocols used to communicate among mobile devices, including advanced mobile phone protocol ("AMPS"), time division multiple access ("TDMA"), code-division multiple access ("CDMA"), global system for mobile communication ("GSM"), general packet radio services ("GPRS") or universal mobile telecommunications system ("UMTS"). Different types of data may be transmitted via different protocols, or the same types of data may be transmitted via different protocols.

The system 100 can include at least one data processing system 102. The data processing system 102 can include at least one logic device such as a computing device having a processor to communicate via the network 101, for example with the client computing device 126 or the 3P developer device 150 or other networked device or third-party device. The data processing system 102 can include at least one computation resource, server, processor or memory. For example, the data processing system 102 can include a plurality of computation resources or servers located in at least one data center. The data processing system 102 can include multiple, logically-grouped servers and facilitate distributed computing techniques. The logical group of servers may be referred to as a data center, server farm or a machine farm. The servers can also be geographically dispersed. A data center or machine farm may be administered as a single entity, or the machine farm can include a plurality of machine farms. The servers within each machine farm can be heterogeneous—one or more of the servers or machines can operate according to one or more type of operating system platform.

Servers in the machine farm can be stored in high-density rack systems, along with associated storage systems, and located in an enterprise data center. For example, consolidating the servers in this way may improve system manageability, data security, the physical security of the system, and system performance by locating servers and high performance storage systems on localized high performance networks. Centralization of all or some of the data processing system 102 components, including servers and storage systems, and coupling them with advanced system management tools allows more efficient use of server resources, which saves power and processing requirements and reduces bandwidth usage.

The system 100 can include, access, or otherwise interact with at least one 3P developer device 150. The 3P developer device 150 can include at least one logic device such as a computing device having a processor to communicate via the network 101, for example with the client computing device 126, or the data processing system 102. The 3P developer device 150 can include at least one computation resource, server, processor or memory. For example, 3P developer device 150 can include a plurality of computation resources or servers located in at least one data center.

The 3P developer device 150 can provide audio based digital components for presentation or display by the client computing device 126 as an audio output digital component. The digital component can include an offer for a good or service, such as a voice based message that states: "Would you like me to order you a taxi?" For example, the 3P developer device 150 can include memory to store a series of audio digital components that can be provided in response to a voice based query. The 3P developer device 150 can also provide audio based digital components (or other digital components) to the data processing system 102 where they can be stored in the data repository 118. The data processing system 102 can select the audio digital components and provide (or instruct the 3P developer device 150 to provide) the audio digital components to the client computing device 126. The audio based digital components can be exclusively audio or can be combined with text, image, or video data.

The 3P developer device 150 can include, interface with, or otherwise communicate with the data processing system 102. The 3P developer device 150 can include, interface, or otherwise communicate with the client computing device 126. The 3P developer device 150 can include, interface, or otherwise communicate with the client computing device 126, which can be a mobile computing device. The 3P developer device 150 can include, interface, or otherwise communicate with the 3P developer device 150. For example, the 3P developer device 150 can provide a digital component to the client computing device 126 for execution by the client computing device 126. The 3P developer device 150 can provide the digital component to the data processing system 102 for storage by the data processing system 102. The 3P developer device 150 can provide rules or parameters relating to the digital component to the data processing system 102.

The client computing device 126 can download an electronic document or application developed by the 3P developer device 150. The client computing device 126 can download the application or electronic document from the data processing system 102 via the network 101. The client computing device 126 can load the electronic document. The client computing device 126 can execute the application. The client computing device 126 can execute, launch, trigger or otherwise access or use the application responsive to a user input or trigger event or condition. The application can include a front-end component and a back-end component. The client computing device 126 can execute or provide the front-end component of the application, while the data processing system 102 or 3P developer device 150 provides a back-end component of the application. The application can include, for example, a viewer component 128.

The client computing device 126 can include, interface, or otherwise communicate with at least one sensor 152, transducer 154, audio driver 156, or pre-processor 158. The client computing device 126 can include a display device 160, such as a light indicator, light emitting diode ("LED"), organic light emitting diode ("OLED"), or other visual indicator configured to provide a visual or optic output. The sensor 152 can include, for example, an ambient light sensor, proximity sensor, temperature sensor, accelerometer, gyroscope, motion detector, GPS sensor, location sensor, microphone, or touch sensor. The transducer 154 can include a speaker or a microphone. The audio driver 156 can provide a software interface to the hardware transducer 154. The audio driver can execute the audio file or other instructions provided by the data processing system 102 to control the transducer 154 to generate a corresponding acoustic wave or sound wave. The pre-processor 158 can include a processing unit having hardware configured to detect a keyword and perform an action based on the keyword. The pre-processor 158 can filter out one or more terms or modify the terms prior to transmitting the terms to the data processing system 102 for further processing. The pre-processor 158 can convert the analog audio signals detected by the microphone into a digital audio signal, and transmit one or more data packets carrying the digital audio signal to the data processing system 102 via the network 101. In some cases, the pre-processor 158 can transmit data packets carrying some or all of the input audio signal responsive to detecting an instruction to perform such transmission. The instruction can include, for example, a trigger keyword or other keyword or approval to transmit data packets comprising the input audio signal to the data processing system 102.

The client computing device 126 can be associated with an end user that enters voice queries as audio input into the client computing device 126 (via the sensor 152) and receives audio output in the form of a computer generated voice that can be provided from the data processing system 102 (or the 3P developer device 150 or the 3P developer device 150) to the client computing device 126, output from the transducer 154 (e.g., a speaker). The computer generated voice can include recordings from a real person or computer generated language.

The client computing device 126 (or computing device, or client device, or digital device) may or may not include a display. For example, the computing device may include limited types of user interfaces, such as a microphone and speaker. In some cases, the primary user interface of the client computing device 126 may be a microphone and speaker, or voice interface. For example, the primary user interface of the client computing device 126 can include a voice-based or audio-based user interface. The client computing device 126 can include a display and have the primary user interface be voice-based or audio-based. The primary user interface of the client computing device 126 can be conversational. A conversational user interface can refer to a user interface that is at least in part driven or facilitated by a natural language processor component 106 of the data processing system 102.

The data processing system 102 can include a content placement system having at least one computation resource or server. The data processing system 102 can include, interface, or otherwise communicate with at least one interface 104. The data processing system 102 can include, interface, or otherwise communicate with at least one natural language processor component 106. The data processing system 102 can include, interface, or otherwise communicate with at least one direct action application programming interface ("API") 108. The interface 104, natural language processing component 106 and direct action API 108 can provide a conversational API or digital assistant functionality. The conversational API or digital assistant can communicate or interface with one or more voice-based interfaces or various digital assistant devices or surfaces in order to provide data or receive data or perform other functionality.

The data processing system 102 can include, interface, or otherwise communicate with at least one validation component 110. The data processing system 102 can include, interface, or otherwise communicate with at least one data value generator component 112. The data processing system 102 can include, interface, or otherwise communicate with at least one cache server 114. The data processing system 102 can include, interface, or otherwise communicate with at least one data repository 118.

The interface 104, natural language processor component 106, direct action API 108, validation component 110, data value generator component 112, and cache server 114 can each include at least one processing unit or other logic device such as programmable logic array engine, or module configured to communicate with the data repository 118 or database. The interface 104, natural language processor component 106, direct action API 108, validation component 110, data value generator 112, cache server 114 and data repository 118 can be separate components, a single component, or part of the data processing system 102. The system 100 and its components, such as a data processing system 102, can include hardware elements, such as one or more processors, logic devices, or circuits.

The data processing system 102 can obtain anonymous computer network activity information associated with a plurality of client computing devices 126 (or computing device or digital assistant device). A user of a client computing device 126 or mobile computing device can affirmatively authorize the data processing system 102 to obtain network activity information corresponding to the client computing device 126 or mobile computing device. For example, the data processing system 102 can prompt the user of the client computing device 126 for consent to obtain one or more types of network activity information. The client computing device 126 can include a mobile computing device, such as a smartphone, tablet, smartwatch, or wearable device. The identity of the user of the client computing device 126 can remain anonymous and the client computing device 126 can be associated with a unique identifier (e.g., a unique identifier for the user or the computing device provided by the data processing system 102 or a user of the client computing device 126). The data processing system 102 can associate each observation with a corresponding unique identifier.

The data processing system 102 can interface with a 3P developer device 150. The 3P developer device 150 can include or refer to a device of a content provider. The content provider can establish an electronic content campaign. The electronic content campaign can be stored as content data in the data repository 118. An electronic content campaign can refer to one or more content groups that correspond to a common theme. A content campaign can include a hierarchical data structure that includes content groups, digital component data objects, and content selection criteria. To create a content campaign, the content provider can specify values for campaign level parameters of the content campaign. The campaign level parameters can include, for example, a campaign name, a preferred content network for placing digital component objects, a value of resources to be used for the content campaign, start and end dates for the content campaign, a duration for the content campaign, a schedule for digital component object placements, language, geographical locations, type of computing devices on which to provide digital component objects. In some cases, an impression can refer to when a digital component object is fetched from its source (e.g., data processing system 102 or content provider), and is countable. In some cases, due to the possibility of click fraud, robotic activity can be filtered and excluded, as an impression. Thus, in some cases, an impression can refer to a measurement of responses from a Web server to a page request from a browser, which is filtered from robotic activity and error codes, and is recorded at a point as close as possible to opportunity to render the digital component object for display on the client computing device 126. In some cases, an impression can refer to a viewable or audible impression; e.g., the digital component object is at least partially (e.g., 20%, 30%, 30%, 40%, 50%, 60%, 70%, or more) viewable on a display device 160 of the client computing device 126, or audible via a speaker of the client computing device 126. A click or selection can refer to a user interaction with the digital component object, such as a voice response to an audible impression, a mouse-click, touch interaction, gesture, shake, audio interaction, or keyboard click. A conversion can refer to a user taking a desired action with respect to the digital component objection; e.g., purchasing a product or service, completing a survey, visiting a physical store corresponding to the digital component, or completing an electronic transaction.

The content provider can further establish one or more content groups for a content campaign. A content group includes one or more digital component objects and corresponding content selection criteria, such as keywords, words, terms, phrases, geographic locations, type of computing device, time of day, interest, topic, or vertical. Content groups under the same content campaign can share the same campaign level parameters, but may have tailored specifications for particular content group level parameters, such as keywords, negative keywords (e.g., that block placement of the digital component in the presence of the negative keyword on main content), bids for keywords, or parameters associated with the bid or content campaign.

To create a new content group, the content provider can provide values for the content group level parameters of the content group. The content group level parameters include, for example, a content group name or content group theme, and bids for different content placement opportunities (e.g., automatic placement or managed placement) or outcomes (e.g., clicks, impressions, or conversions). A content group name or content group theme can be one or more terms that the content provider can use to capture a topic or subject matter for which digital component objects of the content group is to be selected for display. For example, a car dealership can create a different content group for each brand of vehicle it carries, and may further create a different content group for each model of vehicle it carries. Examples of the content group themes that the car dealership can use include, for example, "Make A sports car" "Make B sports car," "Make C sedan," "Make C truck," "Make C hybrid," or "Make D hybrid." An example content campaign theme can be "hybrid" and include content groups for both "Make C hybrid" and "Make D hybrid", for example.

The content provider can provide one or more keywords and digital component objects to each content group. Keywords can include terms that are relevant to the product or services of associated with or identified by the digital component objects. A keyword can include one or more terms or phrases. For example, the car dealership can include "sports car," "V-6 engine," "four-wheel drive," "fuel efficiency," as keywords for a content group or content campaign. In some cases, negative keywords can be specified by the content provider to avoid, prevent, block, or disable content placement on certain terms or keywords. The content provider can specify a type of matching, such as exact match, phrase match, or broad match, used to select digital component objects.

The content provider can provide one or more keywords to be used by the data processing system 102 to select a digital component object provided by the content provider. The content provider can identify one or more keywords to bid on, and further provide bid amounts for various keywords. The content provider can provide additional content selection criteria to be used by the data processing system 102 to select digital component objects. Multiple content providers can bid on the same or different keywords, and the data processing system 102 can run a content selection process or ad auction responsive to receiving an indication of a keyword of an electronic message.

The content provider can provide one or more digital component objects for selection by the data processing system 102. The data processing system 102 can select the digital component objects when a content placement opportunity becomes available that matches the resource allocation, content schedule, maximum bids, keywords, and other selection criteria specified for the content group. Different types of digital component objects can be included in a content group, such as a voice digital component, audio digital component, a text digital component, an image digital component, video digital component, multimedia digital component, or digital component link. A digital component object (or digital component) can include, for example, a content item, an online document, audio, images, video, multimedia content, or sponsored content. Upon selecting a digital component, the data processing system 102 can transmit the digital component object for rendering on a computing device 126 or display device 160 of the client computing device 126. Rendering can include displaying the digital component on a display device, or playing the digital component via a speaker of the client computing device 126. The data processing system 102 can provide instructions to a computing device 126 to render the digital component object. The data processing system 102 can instruct the client computing device 126, or an audio driver 156 of the client computing device 126, to generate audio signals or acoustic waves.

The data repository 118 can include one or more local or distributed databases, and can include a database management system. The data repository 118 can include computer data storage or memory and can store one or more of validation policies 120, account information 122 and data values 124, among other data. The data repository 118 can store the one or more of validation policies 120, account information 122 and data values 124 in one or more data structures, databases, data files, indexes, or other type of data storage.

The data repository 118 can store a validation policy 120 in a data file, data structure, or other storage format. The validation policy 120 can include one or more rules, policies, logic, thresholds, comparisons, or functions used by at least the validation component 110 to validate a third-party ("3P") document provided by the 3P developer device 150. Upon validation of the 3P document by the validation component 110 using a validation policy 120, the data processing system 102 can store the 3P document in the cache server 114. An example of a validation policy 120 can include determining whether the 3P document includes a scripting language, such as JavaScript, and rejecting the 3P document responsive to determining that the 3P document includes JavaScript. Another example of a validation policy can include determining the format of a markup language used to provide tags in the 3P document, and approving the 3P document the format matches a predetermined format indicated in the validation policy 120.

The data repository 118 can store one or more accounts 122. Accounts 122 can include account information. An account 122 can be associated with or for a user of a computing device 126. The account 122 can include, store, or otherwise indicate or provide information or data values 124 associated with a user of the client computing device 126. The user of the client computing device 126 can establish the account 122 with the data processing system 102. The account 122 can include any electronic or digital account. The account 122 can include profile information, historical information, or other data values 124 associated with the user of the client computing device 126. The account 122 can include information previously provided by the client computing device 126 to the data processing system 102. Data values 124 can include, for example, information an electronic account information, identifiers, address information, or preferences. The data values 124 can include information associated with a user that can be used to facilitate a transaction flow on a 3P document 132, or information that can be input into an input form or text box in a 3P document 132.

The data processing system 102 can include an interface 104 (or interface component) designed, configured, constructed, or operational to receive and transmit information using, for example, data packets. The interface 104 can receive and transmit information using one or more protocols, such as a network protocol. The interface 104 can include a hardware interface, software interface, wired interface, or wireless interface. The interface 104 can facilitate translating or formatting data from one format to another format. For example, the interface 104 can include an application programming interface that includes definitions for communicating between various components, such as software components. The interface 104 can communicate with one or more of the client computing device 126, or 3P developer device 150 via network 101.

The data processing system 102 can interface with an application, script or program installed at the client computing device 126, such as an app to communicate input audio signals to the interface 104 of the data processing system 102 and to drive components of the local client computing device to render output audio signals. The data processing system 102 can receive data packets or other signal that includes or identifies an audio input signal. The interface 104 can interface or communicate with one or more components of the client computing device 126. The interface 104 can communicate with, for example, a viewer component 128 executed by the client computing device 126, or a data exchange component 146 of the client computing device 126, a loading orchestrator component 144 executed by the client computing device 126, or an overlay component 148 of the client computing device 126.

The data processing system 102 can include a natural language processor ("NLP") component 106. For example, the data processing system 102 can execute or run the NLP component 106 to receive or obtain the audio signal and parse the audio signal. For example, the NLP component 106 can provide for interactions between a human and a computer. The NLP component 106 can be configured with techniques for understanding natural language and allowing the data processing system 102 to derive meaning from human or natural language input. The NLP component 106 can include or be configured with techniques based on machine learning, such as statistical machine learning. The NLP component 106 can utilize decision trees, statistical models, or probabilistic models to parse the input audio signal. The NLP component 106 can perform, for example, functions such as named entity recognition (e.g., given a stream of text, determine which items in the text map to proper names, such as people or places, and what the type of each such name is, such as person, location, or organization), natural language generation (e.g., convert information from computer databases or semantic intents into understandable human language), natural language understanding (e.g., convert text into more formal representations such as first-order logic structures that a computer module can manipulate), machine translation (e.g., automatically translate text from one human language to another), morphological segmentation (e.g., separating words into individual morphemes and identify the class of the morphemes, which can be challenging based on the complexity of the morphology or structure of the words of the language being considered), question answering (e.g., determining an answer to a human-language question, which can be specific or open-ended), semantic processing (e.g., processing that can occur after identifying a word and encoding its meaning in order to relate the identified word to other words with similar meanings).

The NLP component 106 can convert the audio input signal into recognized text by comparing the input signal against a stored, representative set of audio waveforms (e.g., in the data repository 118) and choosing the closest matches. The set of audio waveforms can be stored in data repository 118 or other database accessible to the data processing system 102. The representative waveforms are generated across a large set of users, and then may be augmented with speech samples from the user. After the audio signal is converted into recognized text, the NLP component 106 matches the text to words that are associated, for example via training across users or through manual specification, with actions that the data processing system 102 can serve. Aspects or functionality of the NLP component 106 can be performed by the data processing system 102 or the client computing device 126. For example, a local NLP component can execute on the client computing device 126 to perform aspects of converting the input audio signal to text and transmitting the text via data packets to the data processing system 102 for further natural language processing.

The audio input signal can be detected by the sensor 152 or transducer 154 (e.g., a microphone) of the client computing device 126. Via the transducer 154, the audio driver 156, or other components the client computing device 126 can provide the audio input signal to the data processing system 102 (e.g., via the network 101) where it can be received (e.g., by the interface 104) and provided to the NLP component 106 or stored in the data repository 118. The audio input signal detected by the sensor 152 can include an initial keyword, hotword, or trigger word that indicates to the client computing device 126 that the input audio signal is to be transmitted to the data processing system 102.

The client computing device 126 can include an audio driver 156, a transducer 154, a sensor 152 and a pre-processor component 158. The sensor 152 can receive or detect an input audio signal (e.g., voice input). The pre-processor component 158 can be coupled to the audio driver, the transducer, and the sensor. The pre-processor component 158 can identify an initial keyword, hotword, trigger keyword or other symbol in the input audio signal that indicates that the input audio signal is to be transmitted to the data processing system 102 for processing by the NLP component 106. The pre-processor component 158 can filter the input audio signal to create a filtered input audio signal (e.g., by removing certain frequencies or suppressing noise, or removing the initial keyword or hotword). The pre-processor component 158 can convert the filtered input audio signal to data packets (e.g., using a software or hardware digital-to-analog converter). In some cases, the pre-processor component 158 can convert the unfiltered input audio signal to data packets and transmit the data packets to the data processing system 102. The pre-processor component 158 can transmit the data packets to a data processing system 102 comprising one or more processors and memory that execute a natural language processor component, an interface, a speaker recognition component, and a direct action application programming interface.

The data processing system 102 can receive, via the interface, from the pre-processor component 158, the data packets comprising the filtered (or unfiltered) input audio signal detected by the sensor. The data processing system 102 can identify an acoustic signature from the input audio signal. The data processing system 102 can identify, based on a lookup in a data repository (e.g., querying a database), an electronic account 122 corresponding to the acoustic signature. The data processing system 102 can establish, responsive to identification of the electronic account 122, a session and an account for use in the session. The account 122 can include a profile having one or more policies. The data processing system 102 can parse the input audio signal to identify a request and a trigger keyword corresponding to the request.

The data processing system 102 can provide, to the pre-processor component 158 of the client computing device 126, a status. The client computing device 126 can receive the indication of the status. The audio driver can receive the indication of the status of the profile, and generate an output signal based on the indication. The audio driver can convert the indication to an output signal, such as sound signal, or acoustic output signal. The audio driver can drive the transducer 154 (e.g., speaker) to generate sound based on the output signal generated by the audio drive.

In some cases, the client computing device 126 can include a display device 160. The display device 160 can include one or more LEDs, lights, display, or other component or device configured to provide an optical or visual output. The pre-processor component 158 can cause the light source to provide a visual indication corresponding to the status. For example, the visual indication can be a status indicator light that turns on, a change in color of the light, a light pattern with one or more colors, or a visual display of text or images.

The NLP component 106 can obtain the input audio signal. From the input audio signal, the NLP component 106 can identify at least one request or at least one trigger keyword corresponding to the request. The request can indicate intent or subject matter of the input audio signal. The trigger keyword can indicate a type of action likely to be taken. The trigger keyword can be a wakeup signal or hotword that indicates to the client computing device 126 to convert the subsequent audio input into text and transmit the text to data processing system 102 for further processing. For example, the NLP component 106 can parse the input audio signal to identify at least one request to leave home for the evening to attend dinner and a movie. The trigger keyword can include at least one word, phrase, root or partial word, or derivative indicating an action to be taken. For example, the trigger keyword "go" or "to go to" from the input audio signal can indicate a need for transport. In this example, the input audio signal (or the identified request) does not directly express an intent for transport, however the trigger keyword indicates that transport is an ancillary action to at least one other action that is indicated by the request.

The NLP component 106 can parse the input audio signal to identify, determine, retrieve, or otherwise obtain the request and the trigger keyword. For instance, the NLP component 106 can apply a semantic processing technique to the input audio signal to identify the trigger keyword or the request. The NLP component 106 can apply the semantic processing technique to the input audio signal to identify a trigger phrase that includes one or more trigger keywords, such as a first trigger keyword and a second trigger keyword. For example, the input audio signal can include the sentence "I want a ride to the airport." The NLP component 106 can apply a semantic processing technique, or other natural language processing technique, to the data packets comprising the sentence to identify the request or trigger phrases "want a ride" and "airport". The NLP component 106 can further identify multiple trigger keywords, such as want and ride. For example, the NLP component 106 can determine that the trigger phrase includes the trigger keyword and a second trigger keyword.

The NLP component 106 can filter the input audio signal to identify the trigger keyword. For example, the data packets carrying the input audio signal can include "It would be great if I could get someone that could help me go to the airport", in which case the NLP component 106 can filter out one or more terms as follows: "it", "would", "be", "great", "if", "I", "could", "get", "someone", "that", "could", or "help". By filtering out these terms, the NLP component 106 may more accurately and reliably identify the trigger keywords, such as "go to the airport" and determine that this is a request for a taxi or a ride sharing service.

In some cases, the NLP component 106 can determine that the data packets carrying the input audio signal includes one or more requests. For example, the input audio signal can include the sentence "I want to purchase an audiobook and monthly subscription to movies." The NLP component 106 can determine this is a request for an audio book and a streaming multimedia service. The NLP component 106 can determine this is a single request or multiple requests. The NLP component 106 can determine that this is two requests: a first request for a service provider that provides audiobooks, and a second request for a service provider that provides movie streaming. In some cases, the NLP component 106 can combine the multiple determined requests into a single request, and transmit the single request to a 3P developer device 150. In some cases, the NLP component 106 can transmit the individual requests to another service provider device, or separately transmit both requests to the same 3P developer device 150.

The data processing system 102 can include a direct action API 108 designed and constructed to generate, based on the trigger keyword, an action data structure responsive to the request. The direct action API 108 can generate the action data structure to cause an application to perform the corresponding action. The direct action API 108 can transmit the action data structure to the application installed on the client computing device 126 to cause the client computing device 126 to perform the corresponding action or initiate an action. The action data structure generated by the direct action API 108 can include a deep link for an application installed on the client computing device 126. The application installed on the client computing device 126 can then perform the action or communicate with the 3P developer device 150 or a 3P developer device 150 to perform the action.

Processors of the data processing system 102 can invoke the direct action API 108 to execute scripts that generate a data structure to provide to an application installed on the client computing device 126, a 3P developer device 150, or other service provider to obtain a digital component, content, order a service or product, such as a car from a car share service or an audiobook. The direct action API 108 can obtain data from the data repository 118, as well as data received with end user consent from the client computing device 126 to determine location, time, user accounts, logistical or other information to allow the 3P developer device 150 to perform an operation, such as reserve a car from the car share service. Using the direct action API 108, the data processing system 102 can also communicate with the 3P developer device 150 to complete the operation by in this example making the car share pick up reservation.

The direct action API 108 can execute a specified action to satisfy the end user's intention, as determined by the data processing system 102. Depending on the action specified in its inputs and the parameters or rules in the data repository 118, the direct action API 108 can execute code or a dialog script that identifies the parameters required to fulfill a user request. The direct action API 108 can execute an application to satisfy or fulfill the end user's intention. Such code can look-up additional information, e.g., in the data repository 118, such as the name of a home automation service, or third-party service, or it can provide audio output for rendering at the client computing device 126 to ask the end user questions such as the intended destination of a requested taxi. The direct action API 108 can determine parameters and can package the information into an action data structure, which can then be sent to another component of the data processing system 102 to be fulfilled.

The direct action API 108 can receive an instruction or command from the NLP component 106, or other component of the data processing system 102, to generate or construct the action data structure. The direct action API 108 can determine a type of action in order to select a template stored in the data repository 118. The actions can be fulfilled by applications provided by the data processing system 102 and submitted by a 3P developer device 150. The application can perform or facilitate the performance of the action. Example types of actions can include, for example, watch action, listen action, read action, navigation action, or weather action. Types of actions can include or be configured to provide, for example, services, products, reservations, tickets, multimedia content, audiobook, manage subscriptions, adjust subscriptions, transfer digital currency, make purchases, or music. Types of actions can further include types of services or products. For example, types of services can include car share service, food delivery service, laundry service, maid service, repair services, household services, device automation services, or media streaming services. Types of products can include, for example, clothes, shoes, toys, electronics, computers, books, or jewelry. Types of reservations can include, for example, dinner reservations or hair salon appointments. Types of tickets can include, for example, movie tickets, sports venue tickets, or flight tickets. In some cases, the types of services, products, reservations or tickets can be categorized based on price, location, type of shipping, availability, or other attributes.

The NLP component 106 can parse the input audio signal to identify a request and a trigger keyword corresponding to the request, and provide the request and trigger keyword to the direct action API 108 to cause the direct action API to generate, based on the trigger keyword, a first action data structure responsive to the request. The direct action API 108, upon identifying the type of request, can access the corresponding template from a template repository (e.g., data repository 118). Templates can include fields in a structured data set that can be populated by the direct action API 108 to further the operation that is requested via input audio detected by the client computing device 126 (such as the operation of sending a taxi to pick up an end user at a pickup location and transport the end user to a destination location). The direct action API 108, or client computing device 126, can launch or trigger an application to fulfill the request in the input audio. For example, a car sharing service application can include one or more of the following fields: device identifier, pick up location, destination location, number of passengers, or type of service. The direct action API 108 can populate the fields with values. To populate the fields with values, the direct action API 108 can ping, poll or otherwise obtain information from one or more sensors 152 of the client computing device 126 or a user interface of the client computing device 126. For example, the direct action API 108 can detect the source location using a location sensor, such as a GPS sensor. The direct action API 108 can obtain further information by submitting a survey, prompt, or query to the end of user of the client computing device 126. The direct action API 108 can submit the survey, prompt, or query via interface 104 of the data processing system 102 and a user interface of the client computing device 126 (e.g., audio interface, voice-based user interface, display, or touch screen). Thus, the direct action API 108 can select a template for the action data structure based on the trigger keyword or the request, populate one or more fields in the template with information detected by one or more sensors 152, from the data value generator component 112, or obtained via a user interface, and generate, create or otherwise construct the action data structure to facilitate performance of an operation by the 3P developer device 150.

The system 100 can include or communicate with a third party ("3P") developer device 150. The 3P developer device 150 can include one or more system or component of system 400 depicted in FIG. 4. The 3P developer device 150 can include or be associated with one or more computing devices or servers. The 3P developer device 150 can generate, construct or develop an electronic document. An electronic document can refer to or include a web page, HTML document, digital media file, images, text, or a web-based application. The electronic document can include input form field, buttons, graphical user interface elements, or widgets. The electronic document can be presented via a computing device 126, and configured to receive input from a user via an interface of the computing device 126. The electronic document can generate a prompt or other request for input from the user. The electronic document can present visual output or audio output. The 3P developer 150 can generate, construct or develop one or more portions of the electronic document. The electronic document can be referred to as a 3P document as it can be provided by the 3P developer device 150. The 3P developer device 150 can provide the electronic document to the data processing system 102.

For example, the 3P developer device 150 can include an online retailer. The online retailer can generate an electronic document that is a web page for a product sold by the online retailer. The electronic document can request input from a user to complete a transaction, such as a financial account number. In another example, the 3P developer device 150 can include a package delivery provider, and the electronic document can provide tracking information. The electronic document can request, from the user, a tracking number in order to perform a lookup and determine the tracking status. The user can input the tracking number via an interface of the computing device 126.

However, due to the limited input capabilities on certain computing devices 126 (e.g., small touchscreen or keyboard, voice only input), it can be challenging to input the requested information into an electronic document. Further, the requested input may not be readily available and may result in additional remote procedure calls or lookups into external sources or external account in order to obtain the requested input information. For example, a user may log into an account or data repository different from the electronic document in order to obtain the information requested by the electronic document. On certain computing devices 126 with limited capabilities, it may be challenging, inefficient or not possible to access such external accounts in order to obtain the requested information for the electronic document. Thus, the 3P developer device 150 can provide the electronic document to the data processing system 102 of the technical solution.

The data processing system 102 can include, interface with or otherwise access a validation component 110 designed, constructed or operational to receive, from a third party developer device 150, the electronic document. The electronic document can be configured to interface with a runtime 140 application programming interface. The validation component 110 can validate the electronic document based on a validation policy 120. The validation component 110 can store, responsive to validation of the electronic document, the electronic document on a cache server 114 of the data processing system 102.

The 3P developer device 150 can construct the electronic document (or 3P document 132) to interface with a runtime API (e.g., runtime 140) by inserting tags using a markup language or declarative language. The markup language can include or indicate tags. The tags can indicate contextual information about the electronic document. Contextual information can include any information about the electronic document that can facilitate the data processing system 102 identifying data values for input into an input form field of the electronic document. Tags can indicate a type of electronic web page, vertical of the electronic web page, topics associated with the electronic web page, type of input used by the electronic web page, or other information associated with the electronic web page, content of the electronic web page, services provided by the electronic web page, or functions provided by the electronic web page.

The validation component 110 can receive an application submitted by a 3P developer device 150. The validation component 110 can validate the electronic document using one or more validation policies 120 stored in the data repository 118. The validation component 110 can retrieve, from the data repository 118, a validation policy 120 to apply to the electronic document. To validate the electronic document, the validation component 110 can parse the electronic document. The validation component 110 can parse the electronic document responsive to receiving the electronic document from the 3P developer device 150. The validation component 110 can validate the electronic document responsive to a request to validate the electronic document. The validation component 110 can receive the request to validate the electronic document from the 3P developer device 150, or from a component of the data processing system 102.

The validation component 110 can use a validation policy 120 to validate the electronic document. The validation policy 120 can indicate types of content, formats, scripts, functions, or components that are prohibited from the electronic document. The validation component 110 can parse the electronic document or extract data from the electronic document. The validation component 110 can compare the output from parsing the electronic document or the results of extracting the electronic document with the validation policy 120 to determine if one or more items or components in the electronic document are prohibited. If the electronic document passes the validation policy 120 (e.g., validation component 110 does not detected any of the prohibited items as indicated by the validation policy 120), the validation component 110 can indicate that the electronic document is valid. If, however, the validation component 110 detects, in the electronic document, one or more prohibited items as indicated by the validation policy 120, then the validation component 110 can determine the electronic document is invalid.

For example, the validation policy 120 can indicate that electronic documents containing an object-oriented language configured to provide interactive effects or functions, such as JavaScript, are invalid. The validation component 110 can parse the electronic document to detect a tag or file name with a ".js" or a text file containing JavaScript code. Upon detecting a *.js file or JavaScript code in the electronic document, the validation component 110 can determine that the electronic document contains or utilizes JavaScript. The validation component 110 can apply or execute the validation policy 120 to determine whether to block, reject, prevent or remove, from storage, the electronic document. Thus, the validation component 110, using the validation policy 120, can determine to validate or not validate the electronic document based on whether the electronic document contains JavaScript. For example, the validation component 110 can validate, responsive to the determination that JavaScript is absent from the electronic document, the electronic document for storage in the cache server 114 of the data processing system 102. If, for example, the validation component 110 detects a presence of JavaScript in an electronic document, the validation component can determine, responsive to detection of the presence of the JavaScript in the electronic document, not to validate the electronic document and remove the electronic document from storage in the cache server 114.

The validation component 110 can validate or invalidate an electronic document based on a format of the electronic document. The validation policy 120 can indicate approved or valid formats. The validation policy 120 can indicate prohibited or invalid formats. For example, the validation policy 120 can indicate valid or invalid formats for a markup language. Formats for a markup language can include, for example, LaTex, Extensible Markup Language (XML), Generalized Markup Language (GML), Standard Generalized Markup Language (SGML), or HyperText Markup Language (HTML). The approved format can be HTML or XML, and the invalid format can be LaTex, for example. The validation policy 120 can further indicate valid or invalid tags.

The validation component 110 can determine, based on a format of the markup language or absence of JavaScript, that the electronic document is valid for secure communication in mobile digital pages. The validation component 110 can store, in the cache server 114, the electronic document responsive to validation of the electronic document for secure communication in mobile digital pages.

The validation component 110 can validate the electronic document before storing the electronic document in storage of the data processing system 102, or in a cache server 114. The data processing system 102 can store validated documents. The data processing system 102 can determine not to store invalid documents. The data processing system 102 can determine to remove invalid electronic documents, or documents that fail the validation process performed by the validation component 110. By determining to not store invalid electronic documents, the data processing system 102 can reduce memory or storage utilization in the data repository 118. The data processing system 102 can prevent or mitigate erroneous activity from occurring on a client computing device 126 by not forwarding an invalid document to the client computing device 126, thereby preventing the client computing device 126 from executing or rendering an invalid document that may contain errors or unauthorized functionality. The data processing system 102 can prevent or mitigate security failures by determining not to forward or transmit invalid documents to client computing devices 126. Thus, the validation component 110 can reduce computing resource utilization of the data processing system 102 (e.g., memory utilization), reduce or prevent errors or crashes from occurring on the client computing device 126, and avoid security failures on the client computing device 126. A security failure can occur as a result of an electronic document containing code, such as JavaScript, that may be susceptible to a hack or vulnerability that can be exploited by a malicious third part. The validation component 110, using the validation policy 120, can determine not to store, in the cache server 114, such electronic document and not to transmit such electronic documents to client computing devices 126.

The data processing system 102 can provide a prompt to the 3P developer device 150 indicating the status of the validation. The data processing system 102 can indicate that validation was successful or that validation was unsuccessful or a failure. If the data processing system 102 determines that an electronic document is invalid or fails validation, the data processing system 102 can automatically resolve, modify, or fix the errors detected in electronic document so the electronic document can be validated, or the data processing system 102 can transmit a request to the 3P developer device 150 to resolve the errors detected in the electronic document.

The data processing system 102 can automatically resolve, debug, or fix the electronic document responsive to detection of an error or that the electronic document is invalid. The data processing system 102 can automatically debug or resolve the electronic document by removing or scrubbing the erroneous or invalid code. For example, the data processing system 102 can remove a JavaScript file or JavaScript code from the electronic document. The data processing system 102 can automatically resolve the electronic document containing code in an invalid format by translating or re-formatting the code into a valid or approved format. For example, the data processing system 102 can detect markup language in LaTex format, and automatically translate the markup language into an approved format such as HTML or XML, or some other approved format. Thus, the validation component 110 can determine whether an electronic document is valid using a validation policy 120, determine whether to store the document, reject the electronic document, or resolve the electronic document prior to storage in the cache server 114.

The data processing system 102 can include a cache server 114 designed, constructed and operational to store third party ("3P") documents 116. 3P documents 116 can refer to one or more electronic documents (e.g., 3P document 132) provided by a 3P developer device 150. The 3P documents 116 can include electronic document that were validated by the validation component 110 for storage in the cache server 114. The cache server 114 can store the 3P documents 116 validated by the validation component 110 and transmit 3P documents 116 to client computing devices 126 upon request. The cache server 114 can provide caching or re-hosting to improve performance.

The cache server 114 can save or store electronic documents that have been validated. The cache server 114 can refer to or include a dedicated network server or service acting as a server that saves electronic documents (e.g., web pages, media files, or other Internet content) locally. The cache server 114 can speed up access to electronic documents by storing electronic documents in a temporary storage or cache. The cache server 114 can reduce demands on bandwidth of the 3P developer device 150 or servers associated with the 3P developer device 150. The cache server 114 can reduce server or network delay or lag by storing or caching electronic documents, such as web pages, images, and other types of Web multimedia.

The cache server 114 can refer to or include a proxy server. A proxy server can be a server that represents client computing devices 126 by intercepting requests from the client computing device 126 and managing the requests for the client computing devices 126. The proxy server can facilitate matching incoming messages with outgoing requests. Thus, the proxy server can cache the files that are received for later recall by a client computing device 126. The client computing device 126, or user thereof, may not be aware of the functionality provided by the proxy server or cache server 114 because requests from the client computing device 126 and returned responses can appear to be coming from the addressed place on the Internet. For example, the viewer component 128 of the client computing device 126 can be configured with an internet protocol ("IP") address of the cache server 114 and can transmit request for electronic documents to the cache server 114.

The cache server 114 can be configured with various controls. For example, controls can include freshness, validation and invalidation. The cache server 114 can be configured with a freshness control to allow a response to be used without re-checking it on the origin server (e.g., 3P developer device 150 or server thereof), and can be controlled by both the server and the client computing device 126. For example, an "expires" response header can provide a date when the electronic document becomes stale, and the Cache-Control: max-age directive can indicate to the cache for how many seconds the response is fresh.

The cache server 114 can be configured with a validation control. The validation control can be used to check whether a cached response is still valid after it becomes stale. For example, if the response has a Last-Modified header, a cache can make a conditional request using the If-Modified-Since header to see if the electronic document has changed. The ETag (entity tag) mechanism can allow for both strong and weak validation. This validation control can take into account one or more aspect of the validation policy 120. The validation control can be set, provided or modified by the validation component 110.

The cache server 114 can be configured with an invalidation control. The invalidation control can refer to clearing, removing or otherwise invalidating the cache or an electronic document stored in the cache. The invalidation control can be set if a URL associated with a cached response subsequently gets a POST, PUT or DELETE request. The invalidation control can take into account one or more aspect of the validation policy 120. The invalidation control can be set, provided or modified by the validation component 110.

The cache server 114 can store the 3P documents 116 in a temporary storage, memory, or other type of storage. The 3P documents 116 can be stored in a data structure, as data files or other data storage technique. The 3P documents 116 can be associated with an identifier, metadata, or an indication of the 3P developer device 150 that provided the electronic document. The 3P documents 116 can be stored with an indication of an expiration date of the electronic document or other information to facilitate delivering or transmitting electronic documents. 3P documents 116 can include electronic documents provided by one or more 3P developer devices 150 via network 101.

The data processing system 102 can receive a request for electronic content from a client computing device 126. The data processing system 102 can intercept a request for the electronic content. The request can be for electronic content of the 3P developer device 150. The data processing system 102 can receive the request from a component of the client computing device 126. For example, the client computing device 126 can execute a component configured to transmit requests for electronic content to the data processing system 102.

The client computing device 126 can include or execute a viewer component 128. The viewer component 128 can include an application designed, constructed or operational to render or present electronic content. The viewer component 128 can include, for example, an application. The viewer component 128 can include a web browser, native application, web application, or other component configured to transmit requests for electronic content, receive electronic content, and render electronic content. The viewer component 128 can be configured to transmit requests for electronic documents to the cache server 114. The cache server 114 can intercept a request to access the electronic document. Intercepting the request can refer to the cache server 114 receiving the request for the electronic document instead of the 3P developer device 150. The cache server 114 can intercept the request by configuring the viewer component 128 with the IP address of the cache server 114 such that requests for electronic documents for the 3P developer device 150 are transmitted to the cache server 114 instead of the 3P developer device 150, or a server associated with the 3P developer device 150. By configuring the viewer component 128 to transmit requests to the cache sever 114 instead of the 3P developer device 150, the system 100 can reduce lag or delay associated with responses to requests for electronic document.

Responsive to the request for the electronic document, the cache server 114 can perform a lookup in storage of the cache server 114 to determine that the electronic document has been validated and stored in the cache server 114. The cache server 114 can retrieve, from storage (e.g., 3P documents 116) in the cache server 114, the electronic document instead of accessing a server of the third party developer device 150 that provided the electronic document. The cache server 114 can transmit, from storage of the cache server 114, the electronic document to the viewer component 128 executed by the client computing device 126.

The viewer component 128 can include or execute a loading orchestrator component 144 designed, configured or operational to load electronic documents in the viewer component 128. The loading orchestrator component 144 can receive the electronic document from the data processing system 102. The loading orchestrator component 144 can parse or process the electronic document to render or otherwise present the electronic document in the viewer component 128. The loading orchestrator component 144 can parse the electronic document received from the cache server 114 to determine whether to retrieve, download, or otherwise obtain or utilize additional resources for the electronic document. The loading orchestrator component 144 can parse the markup language of the electronic document (e.g., HTML) to determine whether to download additional resources.

The loading orchestrator component 144 can transmit one or more requests to the data processing system 102 (or cache server 114 or other external server) to download one or more additional files or resources associated with the electronic document. Additional files or resources can include, for example, a cascading style sheet ("css" file) or images. A css file can be a text file used for formatting content on the electronic document and can include information such as font, size, color, spacing, boarder, or location of HTML information on the electronic document. The loading orchestrator component 144 can, upon downloading the one or more files or resources associated with the electronic document, build the electronic document. The loading orchestrator component 144 can build the electronic document for display by combining the information found in the retrieved electronic document (e.g., the original HTML file) and the additional information found in the resources. The loading orchestrator component 144 can build the document object map ("DOM"), which can include a map of where things are displayed on a page according to the HTML. The DOM can map out the page in a relational manner. The loading orchestrator component 144 can build the CSS object map ("CSSOM"), which can map what styles should be applied to different parts of the electronic document according to the CSS using styles. The loading orchestrator component 144 can build a render tree, which can include combining the DOM and the CSSOM to create a map of how the electronic document is to be laid out and painted.

The loading orchestrator component 144 can render or paint the electronic document in an iframe 130 of the viewer component 128 after building the electronic document. The viewer component 128 can include an iframe 130. An iframe 130 can refer to an inline frame. The iframe 130 can be an HTML document embedded inside another HTML document in the viewer component 128. The viewer component 128 can use the iframe 130 element to insert the electronic document for display via the viewer component 128. The iframe 130 can be embedded in the viewer component 128. The viewer component 128 can load, in the iframe 130, the electronic document for display via the client computing device 126. The viewer component 128 can restrict the iframe 130 from accessing certain portions of the viewer component 128 or accessing certain memory or functionality of the client computing device 126. Thus, the viewer component 128 can establish security restrictions or other controls for the iframe 130 to limit the types of access or functionality provided by the iframe 130.

The loading orchestrator component 144 can load, render, present or embed the electronic document (or 3P document 132) in the iframe 130. The 3P document 132, which can refer to the electronic document retrieved from the cache server 114 and presented in the iframe 130, can include main content 134. Main content 134 can include, for example, text, images, video, or audio. Main content 134 can include, for example, a news article, an entertainment website, blog posts, games, services, or other content. The 3P document 132 can include tags 136 coded in a markup language 138. Markup language 138 can be in a format and of a type approved by the validation component 110. The markup 138 can be used to provide tags 136 in the 3P document 132 that provide contextual indication for the 3P document 132.

Tags 136 can indicate information about the 3P document 132 or information about input requested by the 3P document 132. Tags 136 can indicate a type of input, information about the input, input parameters, input values, or format of the input. Tags 136 can include predetermined tags or custom tags. For example, on an 3P document 132 used to track delivery or shipping status, a tag 136 can indicate that input requested for 3P document 132 in order to fulfill or perform a tracking service includes a tracking number for the item being delivered or shipped. In another example, for a 3P document 132 used to purchase an item the tag 136 can indicate that input requested for the 3P document 132 in order to fulfill or perform the purchase includes an address of the user or financial account information. Thus, the tag 136 can indicate input information that facilitates the 3P document 132 or 3P developer device 150 in performance or fulfillment of an action, request or service associated with the 3P document 132. The 3P developer (e.g., via the 3P developer device 150) can establish the tags 136 in the 3P document 132 using a markup language 138 to facilitate data exchange via a secure communication channel 142. Tags 136 can include alphanumeric characters, symbols, or strings. For example, if the markup language 138 includes HTML, the tags can be provided as a meta tag or hidden tag. The tags 136 can include an indication that the tag 136 is to be used by the runtime component 140 or data processing system 102 for selecting data values for input to the 3P document 132.

The viewer component 128 can host a runtime component 140 designed, constructed or operational to identify a tag 136 coded with a markup language 138 in the electronic document (e.g., 3P document 132). The runtime component 140 can include one or more rules or components. The runtime component 140 can include code, program, functions, or logic. The runtime component 140 can include JavaScript. The runtime component 140 can be configured to interface with the 3P document 132. For example, the 3P document 132 can be presented in an iframe 130 that has restricted access. The 3P document 132 can interface with the runtime component 140 via an application programming interface. The runtime component 140 can parse the 3P document 132 to identify tags 136 in the 3P document 132. Responsive to the viewer component 128 receiving or loading the 3P document 132 in the iframe 130, the runtime component 140 can execute. The runtime component 140 can parse the 3P document 132 to identify tags 136. For example, tags 136 can include an indication that triggers the runtime component 140 to capture the tag 136 or information thereof, such as contextual information about the 3P document 132.

The runtime component 140 can parse the tags to determine the contextual information. The runtime component 140 can extract the contextual information from the tags 136 using any parsing technique, including, for example, keyword parsing technique, semantic parsing, or other processing. The runtime component 140 can forward the contextual information to the data exchange component 146 of the viewer component 128 for forwarding to the data processing system 102. The runtime component 140 can forward the extracted information to the data exchange component 146 via a secure communication channel 142.

The viewer component 128 can include or execute a data exchange component 146. The data exchange component 146 can include one or more rules, scripts, or a program. The data exchange component 146 can receive, from the runtime component 140 via a secure communication channel 142, an indication of the tag 136.

The runtime component 140 and data exchange component 146 can establish the secure communication channel 142. The secure communication channel 142 can be secure because the 3P developer device 150 may not be able to access the data or contents transmitted via the secure communication channel 142. The secure communication channel 142 can refer to a communication between a component executed within an iframe 130 and a component outside the iframe 130, such as the data exchange component 146 executed by the viewer component 128. The secure communication channel 142 can be used to transmit messages between the runtime component 140 and the data exchange component 146. Messages can be sent to, from or between iframes or a parent frame using the secure communication channel 142. For example, the viewer component 128 (e.g., via data exchange component 146) can send messages to an iframe 130 (or runtime component 140 thereof) using, for example, "iframeEl.contentWindow.postMessage". The viewer component 128 or parent frame, via the data exchange component 146, can receive messages using, for example, "window.addEventListener ('message'). The iframe 130 (or runtime component 140) can send messages to the viewer component 128 using, for example, "window.parent.postMessage". The iframe 130 (e.g., runtime component 140) can receive messages using, for example, "window.addEventListener ('message'). This postMessage( ) technique can accept parameters, such as message and targetOrigin. The message parameter can include a string or an object that is to be sent to the receiving window. The targetOrigin parameter can include the uniform resource locator ("URL") of the window that the message is being sent to. The protocol, port and hostname of the target window can be set to match this parameter for the message to be sent. Using a wildcard, such as "*" can match any URL.

The data exchange component 146 and runtime component 140 can communicate with one another. For example, the data exchange component 146 can correspond to a parent frame and the runtime component 140 can execute in an iframe 130 that is a child frame of the parent frame. In another example, the data exchange component 146 can be loaded in a separate iframe 130, in which case the data exchange component 146 and runtime component 140 can communicate with one another using the parent frame of the viewer component 128 as a relay. For example, a parent frame (e.g., first frame) can have two child iframes (e.g., second iframe and third iframe). The second iframe can communicate with the parent frame, which can relay the communication to the third iframe. The third iframe can reply to the communication by sending a message back to the parent frame, which can relay the message to the second iframe. Thus, the secure communication channel 142 can include the viewer component 128 relaying messages between the runtime 140 and the data exchange component 146.

The data exchange component 146 can transmit, to the data processing system 102, the contextual information extracted by the runtime component 140 from tags 136. The data exchange component 146 can transmit the extracted information with a request for data values or additional information responsive to the contextual information associated with the 3P document 132. The data exchange component 146 can communicate with the data processing system 102 to obtain data values. The data processing system 102 can include a data value generator component 112 designed, constructed or operational to obtain data values responsive to the tags 136 in the 3P document 132. The data value generator component 112 can receive, from the viewer component 128 (e.g., via the data exchange component 146) the indication of the tag 136. The data value generator component 112 can select, based on the indication of the tag 136, a data value.

The data value generator component 112 can use one or more selection technique to identify data values responsive to the tags 136 received from the data exchange component 146. The data value generator component 112 can access data repository 118 to identify account information 122 that stores data values 124. The data value generator component 112 can perform a lookup in the account 122 data structure to determine data values 124 that are responsive to the tag 136 and facilitate the 3P document 132 or 3P developer device 150 in performance of a service, action or function. The data value generator component 112 can select or identify values that can be used by the direct action API 108 to generate an action data structure that can be transmitted to the 3P developer device 150 to perform or fulfill a request.

The data value generator component 112 can use a semantic processing technique, selection criteria, machine learning, or other technique to select or identify candidate data values. The data value generator component 112 can access one or more sources to determine the data values. For example, the data value generator component 112 can access an account data structure 122 containing data values 124 associated with the client computing device 126, or user thereof. The data processing system 102 can be configured to query external data sources associated with the client computing device 126, responsive to authorization from the client computing device 126.

The data value generator component 112 can identify one or more data values that are responsive to the context information received from the data exchange component 146. The data value generator component 112 can identify multiple data values. The data value generator component 112 can determine to transmit one or more data values identified by the data value generator component 112 to the data exchange component 146 or viewer component 128. In some embodiments the data value generator may not be able to identify particular data values that are directly responsive to the context information and the data value generator component 112 can determine to transmit a subset of the identified data values based on a ranking or filter technique. For example, each data value can be associated with a confidence score or ranking score or relevance score. The data value generator component 112 can determine to transmit the highest ranking data values because those data values may be the most likely to be responsive to the contextual information of the 3P document 132. In some cases, the data value generator component 112 can transmit the top three ranking data values, top five, top 10, or other number of the data values.

For example, the contextual information can indicate that address information is requested by the 3P document 132 in order to perform a service or action. The data value generator component 112 can perform a lookup in the data value data structure 124 of the account 122 corresponding to the client computing device 126 to identify the address. The data value 124 can include one or more addresses. The data value generator component 112 can transmit, responsive to the request, the one or more addresses retrieved from the data values data structure 124. In another example, the contextual information can indicate that a financial account information is requested by the 3P document 132 to perform an action or service. The data value generator component 112, upon receiving the contextual information, can perform a lookup in the data value 124 data structure to identify one or more account identifiers, and transmit, via network 101, the one or more account identifiers to the viewer component 128. Thus, the data value generator component 112 can generate data values responsive to the contextual information extracted by the runtime component 140 from tags 136.

The viewer component 128 can receive data values generated or provided by the data value generator 112. The viewer component 128 can prevent the 3P document 132 from accessing the received data values. For example, the secure communication channel 142 can control access to the data values or prohibit access by the 3P document 132. The viewer component 128, upon receiving the data values from the data processing system 102, can request authorization from the client computing device 126, or user thereof, before inputting the data values into the 3P document 132.

The viewer component 128 can include or execute an overlay component 148 designed, constructed or operational to generate a prompt comprising the one or more data values received from the data processing system 102. The overlay component 148 can generate graphical user interface, window, button, or other notification that includes the one or more data values. The overlay component 148 can generate the prompt containing the data values prior to granting the 3P document 132 with access to the data values, thereby maintaining a secure communication channel 142. The overlay component 148 can generate a popup window or other user interface element with one or more buttons or controls. The overlay component 148 can determine to overlay the window over the 3P document 132. For example, the overlay component 148 can generate a suggestion drop down menu or auto fill drop down menu or suggests at a position on the 3P document 132 that corresponds to the input form field or input text box on the 3P document 132. The overlay component 148 can render the data value on the 3P document 132 in a separate iframe that is secure and cannot be accessed by the 3P document 132.

The overlay component 148 can provide the data values for display and include an input button to allow the client computing device 126 to select the data value or authorize a data value for transmission to the 3P document 132. For example, the overlay component 148 can receive three different addresses from the data value generator component 112. The overlay component 148 can provide, in a secure manner, an indication of the three candidate addresses via the viewer component 128. The overlay component 148 can include a button or other input mechanism to allow the client computing device 126 to select one of the three candidate addresses. The viewer component 128 can receive, from the client computing device 126, a selection of a data value or an authorization to transmit or provide the data value to the 3P document 132. The viewer component 128 can receive, responsive to the prompt, input from the client computing device 126 authorizing the data value.

Responsive to the authorization of the data value, the viewer component 128 can provide the data value to the 3P document 132. The viewer component 128 can provide the data value via the secure communication channel 142 established between the data exchange component 146 and the runtime component 140. The secure communication channel 142 can be configured to prohibit the 3P document 132 from accessing the data value prior to authorization of the data value. For example, the overlay component 148 may have had access to the data value in order to generate the prompt, but the runtime component 140 and 3P document 132 may not have had access to the data value unless it was authorized by the client computing device 126. Further, the 3P document 132 or runtime component 140 may not have access to all the candidate data values transmitted by the data processing system 102 to the viewer component 128 and provided in the prompt by the overlay component 148. Rather, the 3P document 132 may be granted access to the data value authorized by the client computing device 126, but not to the other candidate data values displayed in the prompt by the overlay component 148 but not selected by the client computing device 126 for provision to the 3P document 132. Thus, the secure communication channel 142 can be configured to only transmit extracted information from the tags 136 to the data exchange component 146, and transmit authorized data values to the runtime component 140 for input into the 3P document 132. Thus, the viewer component 128 can provide, via the secure communication channel 142 and responsive to the input from the prompt, the data value to the runtime component 140 to cause the runtime component 140 to execute an action with the data value via the electronic document (e.g., 3P document 132).

The runtime component 140 can input the data value into the 3P document 132 and cause the 3P document 132 to execute an action using the data value. For example, the runtime component 140 can input an address into an input form field in the 3P document 132, and then select a link or other trigger to initiate processing of the address to perform a function. The runtime component 140 can input one or more authorized data values into one or more input fields in the 3P document 132.

For example, the data processing system 102 can receive, from the viewer component 128 interfacing with the runtime component 140 via the secure communication channel 142, the indication of the tag 136. The data processing system 102 (e.g., via the data value generator component 112) can retrieve, responsive to the tag 136, the data value from an account 122 associated with the client computing device 126 stored on the data processing system 102. The data processing system 102 can provide, to the viewer component 128, the data value to cause the viewer component 128 to generate the prompt including the data value. The data processing system 102 can identify the data value responsive to receipt of the indication of the tag from the viewer component 128. The data processing system 102 can search one or more electronic data sources associated with the client computing device 126 to identify the data value responsive to the indication of the tag. In some cases, the data processing system 102 can identify multiple candidate data values responsive to receipt of the indication of the tag 136 from the viewer component 128, and provide the multiple candidate data values for display in the prompt. The prompt can restrict access by the 3P document 132 (e.g., electronic document) to at least one of the plurality of candidate data values that has been authorized by the client computing device 126, but deny or prohibit access to the data values that have not been authorized by the client computing device 126, thereby providing a secure communication channel 142. Thus, the viewer component 128 blocks access to the data value by the 3P document 132 (e.g., electronic document) prior to the input from the client computing device 126 authorizing or granting the access. The input can include an instruction from the client computing device 126 to grant the electronic document access to the data value provided by the data processing system 102 responsive to the indication of the tag 136.

Figure 2:
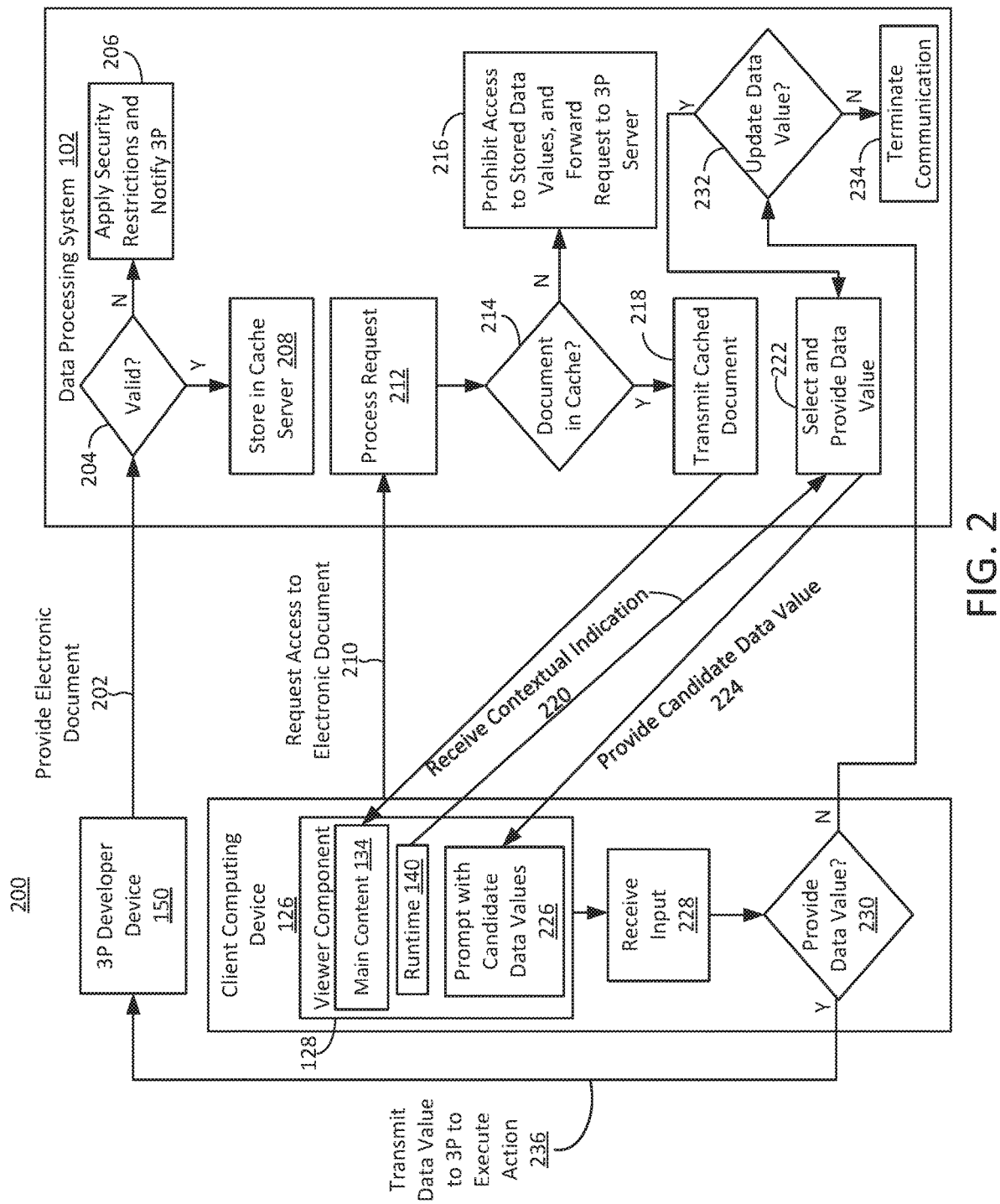
FIG. 2 is an illustration of an example operation of a system for secure communication in mobile digital pages.

FIG. 2 is an illustration of the operation of system 200 for secure communication in mobile digital pages. The system 200 can include one or more component of system 100 depicted in FIG. 1 or system 400 depicted in FIG. 4. System 200 can include a data processing system 102. The data processing system 102 can communicate, interface with, or otherwise interact with a 3P developer device 150. At ACT 202, the data processing system can receive an electronic document (e.g., 3P document) from the 3P developer device 150. The 3P developer device 150 can provide or upload the electronic document to the data processing system 102. At ACT 204, the data processing system 102 can determine whether the electronic document is valid. The data processing system 102 can use a validation policy to determine whether the electronic document is valid. The validation policy can take into account types of code in the electronic document, format of the electronic document, or content of the electronic document. For example, the data processing system 102 can determine that an electronic document is invalid if it contains JavaScript or markup language in an unapproved format.

If the data processing system 102 determines the electronic document is not valid, the data processing system 102 can apply security restrictions and notify the 3P developer device 150 at ACT 206. The data processing system 102 can generate a prompt or notification indicating that the electronic document failed validation or is invalid. The data processing system 102 can further indicate the reasons the electronic document is invalid and provide a suggestion as to how to resolve, fix or otherwise modify the electronic document to make the electronic document valid. If the data processing system 102 determines the electronic document is valid at ACT 204, the data processing system 102 can proceed to store the electronic document in a cache server at ACT 208.

At ACT 210, the data processing system 102 can receive a request to access the electronic document 210. A client computing device 126 can request access to the electronic document. The data processing system 102 can receive the request from the client computing device 126. The client computing device 126 can include or execute a viewer component 128. The viewer component 128 can be configured to transmit the request to the data processing system 102 or a cache server of the data processing system 102. For example, the viewer component 128 can be configured with an IP address of the data processing system 102 to use to route requests for electronic documents or certain types of electronic documents.

The data processing system 102, upon receiving the request via ACT 210, can process the request at ACT 212. The data processing system 102 can parse the identifier of the electronic document to determine whether the data processing system 102 has a cached version of the electronic document. The data processing system 102 can perform a lookup in a cache server using the identifier to determine whether the electronic document is in the cache. If the data processing system 102 determines the electronic document is not stored in the cache server, the data processing system 102 can proceed to ACT 216 and prohibit access to stored data values. The data processing system 102 can forward the request to a 3P developer device 150 or a server associated with the 3P developer device 150. For example, the data processing system 102 can determine that the electronic document is not stored in the cache because the electronic document has not yet been validated or determined to be invalid at ACT 204. Thus, one of the security restrictions that can be applied at ACT 206 to the invalid document can include prohibiting access to stored data values and directly forwarding the request for the electronic document to the 3P developer device 150 or server thereof.

If, however, the data processing system 102 determines that the electronic document is stored in the cache at ACT 214, the data processing system 102 can proceed to transmitting the cached document at ACT 218 to the client computing device 126. The client component device 126 can receive the electronic document. The viewer component 128 executing on the client computing device 126 can load the electronic document. The viewer component 128 can load main content 134 of the electronic content, such as an article, images, video or other content to be presented for display. The viewer component 128 can render or load the electronic document in an iframe. The viewer component 128 can host a runtime component 140 that can parse the electronic document to identify tags in the electronic document coded using a markup language. The runtime component 140 can use JavaScript to parse the electronic document to extract tags or other contextual information. In some cases, the electronic document may not include tags configured by the 3P developer device 150, and the runtime component 140 can extract the contextual information using semantic processing techniques.

The runtime component 140, upon identifying the contextual information, can transmit the contextual information to the data processing system 102 at ACT 220. In some cases, the data processing system 102 may have access to the contextual information in the cache server and without receiving the contextual information from the runtime component 140. Responsive to identifying the contextual information of the electronic document, the data processing system 102 can select and provide data values at ACT 222. The data processing system 102 can use the contextual information to select data values. The data processing system 102 can access one or more data sources associated with the client computing device 126 to identify data values. The data processing system 102 can access profile information, account information, or other data sources authorized by the client computing device 126. The data processing system 102 can identify one or more data sources linked to the client computing device 126, and perform a lookup or otherwise select or extract data values from the data sources.

The data processing system 102 can provide the identified data values as candidate data values at ACT 224. The data values can be referred to as candidate data values because they have not yet been authorized or approved by the client computing device 126 for input into the electronic document. The data processing system 102 can provide one or more data values as candidate data values. The data processing system 102 can provide the data values to the viewer component 128 to cause the viewer component 128 to generate a prompt with candidate data values at ACT 226. The prompt can be provided as an overlay over the electronic document or otherwise indicated to the user of the client computing device 126 without inputting the one or more data values into the electronic document. The viewer component 128 can generate the prompt using any graphical user interface widget or functionality. In some cases, the prompt can include an audio prompt instead of or in addition to a graphical or visual prompt.

At ACT 228, the viewer component 128 can receive input. The input can indicate whether to authorize a data value for input into the electronic document. The input can include, for example, a selection, click, gesture, voice input, motion, or other indication that a data value provided via the prompt at ACT 226 is authorized or approved for input into the electronic document. At ACT 230, the viewer component 128 can determine whether to provide the data value to the electronic document. If the viewer component 128 determines to provide the data value, the viewer component 128 can proceed to ACT 236 and transmit the data value to the electronic document of the 3P developer device 150 to cause the electronic document or 3P developer device to execute an action. If, however, the viewer component 128 determines, at ACT 230, not to provide the data values based on the user input received at ACT 228, the viewer component 128 can transmit an indication to the data processing system 102 that the data values were rejected.

At ACT 232, responsive to receiving the indication that the data values were rejected from the client computing device 126, the data processing system 102 can determine whether to update the data value. Updating the data value can refer to identifying additional candidate data values or providing additional candidate data values that were not initially provided to the client computing device at ACT 224. The data processing system 102 can determine to perform an additional lookup or select additional data values from one or more data sources. If the data processing system 102 identifies additional data values that are responsive to the contextual information of the electronic document, the data processing system 102 can return to ACT 222 to select and provide the additional data values to the client computing device 126. If, however, the data processing system 102 does not identify any additional data values, the data processing system 102 can proceed to ACT 234 to terminate the communication with the viewer component 128. For example, the data processing system 102 can determine that additional candidate data values are not available to the data processing system 102, and terminate the communication in order to reduce network bandwidth utilization, or session management by the data processing system 102.

Figure 3:
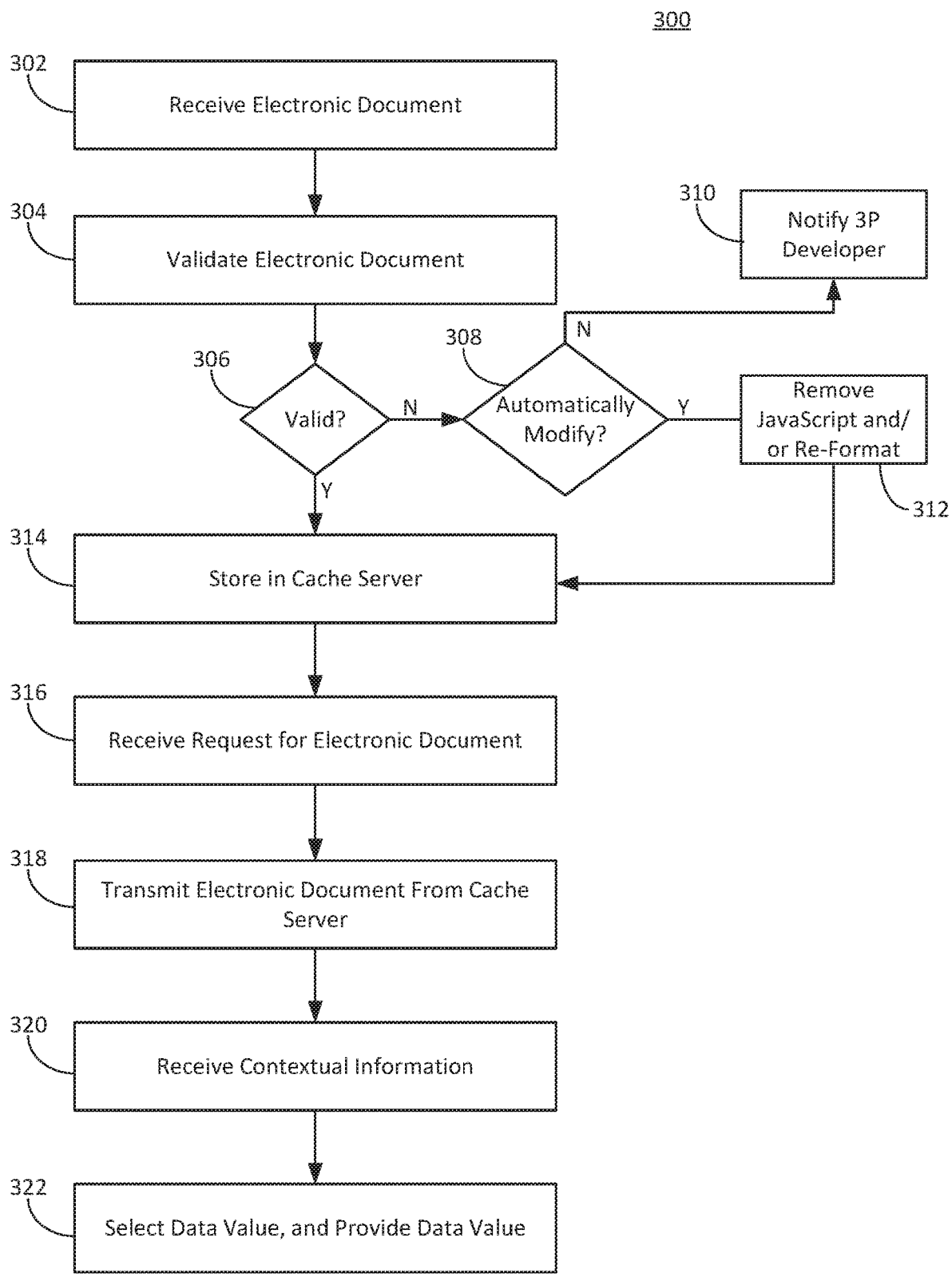
FIG. 3 is an illustration of an example method for secure communication in mobile digital pages.

FIG. 3 is an illustration of an example method of secure communication in mobile pages. The method 300 can be performed by one or more component, system or element of system 100 depicted in FIG. 1, system 200 depicted in FIG. 2, or system 400 depicted in FIG. 4. For example, the method 300 can be performed by a data processing system. At ACT 302, the data processing system can receive an electronic document. The data processing system can receive the electronic document from a 3P developer device. The data processing system can receive an electronic document configured to interface with a runtime application programming interface ("API"). A runtime API can refer to or include a JavaScript program that can parse the electronic document to extract information, and provide input information to the electronic document.

At ACT 304, the data processing system can validate the electronic document. The data processing system can validate the electronic document using a validation policy. Validating the electronic document can include, for example, determining whether the document includes certain types of content, code, or formats. The data processing system can validate the document if it does not include prohibited content, code or formats. The data processing system can invalidate the document should the electronic document contain prohibited content, code or formats. By invalidating certain documents, the data processing system can reduce security risks, errors, bugs, crashes on client computing devices, and wasted computing resource utilization.

If, at ACT 306, the data processing system determines the electronic document is not valid, the data processing system can proceed to ACT 308 to determine whether to automatically modify the electronic document. The data processing system can determine whether to automatically modify the electronic document based on one or more factors or policies. The data processing system can determine to automatically modify the electronic document if the 3P developer device authorized or instructed the data processing system to automatically modify documents that were invalid. The data processing system can determine to automatically modify the electronic document if the reason the document was determined invalid corresponds to an issue that the data processing system is configured to remedy. For example, if the document was invalid because of formatting or a format of the markup language, and the data processing system is configured to re-format the document to an approved markup language format, then the data processing system can proceed to reformatting the electronic document. The data processing system can determine to automatically modify the electronic document if modification includes removing references to JavaScript. The data processing system can determine not to modify if it would entail removing aspects of the electronic document that could result in further errors or bugs. The data processing system can, therefore, determine to modify the electronic document based on the amount or type of validation failures.

If the data processing system determines not to automatically modify the electronic document, the data processing system can proceed to ACT 310 and notify the 3P developer that the electronic document is invalid, reasons why the document is invalid, and request the 3P developer to resolve the issues in the electronic document.

If, at ACT 308, the data processing system determines to automatically modify the electronic document, the data processing system can proceed to ACT 312 and modify the electronic document. The data processing system can modify the electronic document by removing JavaScript, or re-formatting the electronic document based on the validation policy.

The data processing system can proceed to ACT 314 to store the electronic document in the cache server. If, at ACT 306, the data processing system determines the document is valid based on the validation policy, the data processing system can proceed to ACT 314 to store the electronic document in the cache server. The data processing system can store, responsive to validation of the electronic document or modification of the electronic document, the electronic document on a cache server of the data processing system.

At ACT 316, the data processing system can receive a request for the electronic document. The data processing system can receive the request from a client computing device. The request can be to access the electronic document. The data processing system can transmit the electronic document from the cache server at ACT 318.

At ACT 320, the data processing system can receive contextual information from the client computing device. The contextual information can be extracted from tags in the electronic document. For example, a viewer component executing on the client computing device can load, in an iframe, the electronic document for display via the client computing device. The viewer component can execute, in the electronic document, a runtime component to identify a tag coded with a markup language in the electronic document. The viewer component can receive, from the runtime component via a secure communication channel, an indication of the tag. The secure communication channel can refer to a communication that restricts or prohibits the electronic document from accessing data that may be accessible or available to the viewer component or other component of the viewer component. The data processing system can receive, from the viewer component, the indication of the tag.

At ACT 322, the data processing system can select a data value based on the indication of the tag. The data processing system can select the data value responsive to the contextual information. The data processing system can select the data values using a lookup technique, matching technique, semantic technique, or other selection or identification technique. The data processing system can access one or more authorized or approved data sources associated with or linked to the client computing device.

The data processing system can provide the candidate data value to the client computing device. The data processing system can transmit the data value to cause the viewer component executing on the client computing device to perform one or more actions. Prior to providing the data value as input to the electronic document, the viewer component can generate a prompt with the data value. The viewer component can receive, responsive to the prompt, input from the client computing device. If the input includes a selection of the data value and authorization to input the data value, the viewer component can provide, via the secure communication channel and responsive to the input, the data value to the runtime component. The runtime component can then input the data value into the electronic document to execute an action with the data value via the electronic document. Thus, the selected data value, as opposed to any unselected data values, can be provided securely to the electronic document upon authorization.

Figure 4:
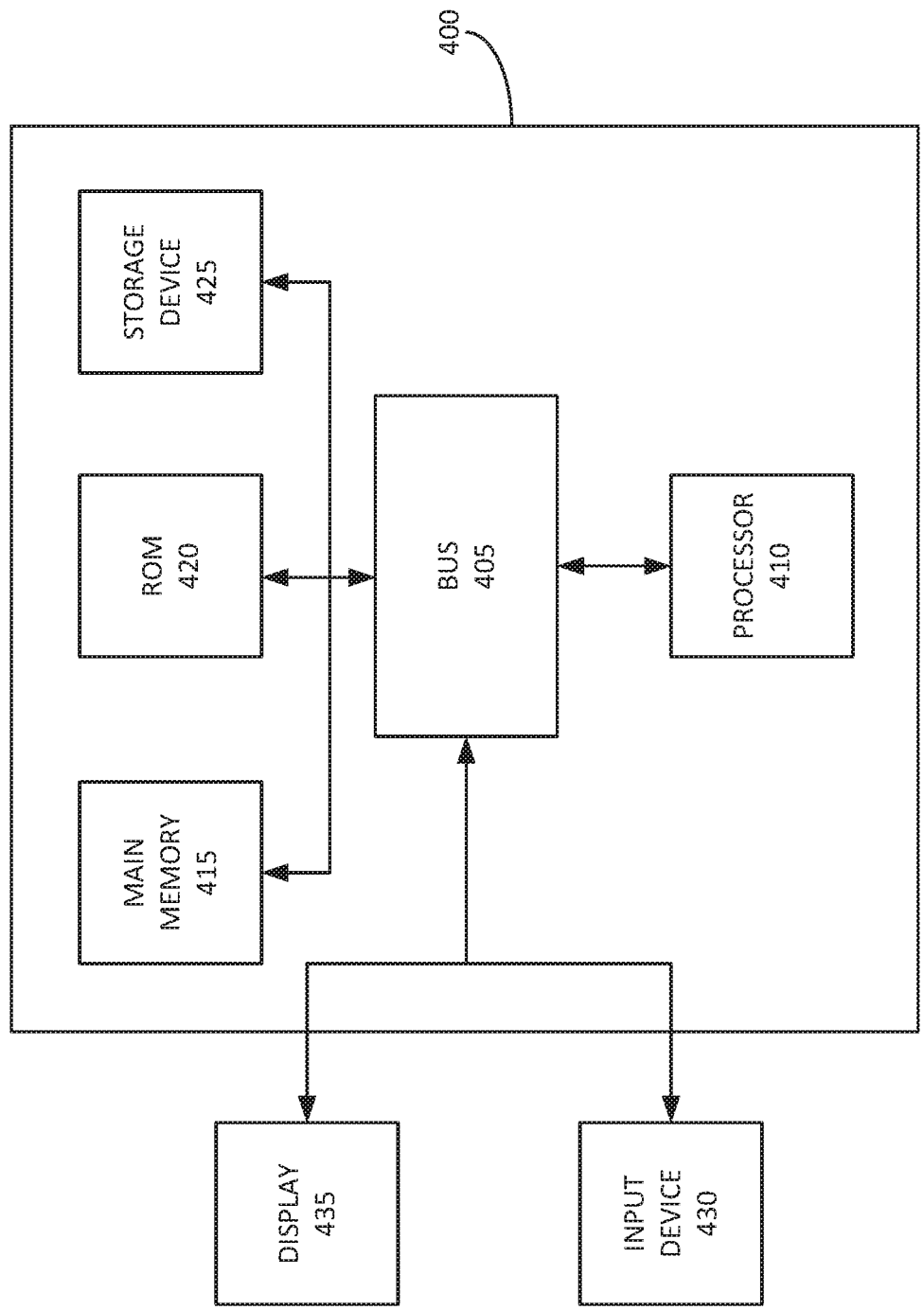
FIG. 4 is a block diagram illustrating a general architecture for a computer system that can be employed to implement elements of the systems and methods described and illustrated herein, including, for example, the systems depicted in FIGS. 1 and 2, and the method depicted in FIG. 3.

FIG. 4 is a block diagram of an example computer system 400. The computer system or computing device 400 can include or be used to implement the system 100, or its components such as the data processing system 102. The data processing system 102 can include an intelligent personal assistant or voice-based digital assistant. The computing system 400 includes a bus 405 or other communication component for communicating information and a processor 410 or processing circuit coupled to the bus 405 for processing information. The computing system 400 can also include one or more processors 410 or processing circuits coupled to the bus for processing information. The computing system 400 also includes main memory 415, such as a random access memory (RAM) or other dynamic storage device, coupled to the bus 405 for storing information, and instructions to be executed by the processor 410. The main memory 415 can be or include the data repository 145. The main memory 415 can also be used for storing position information, temporary variables, or other intermediate information during execution of instructions by the processor 410. The computing system 400 may further include a read only memory (ROM) 420 or other static storage device coupled to the bus 405 for storing static information and instructions for the processor 410. A storage device 425, such as a solid state device, magnetic disk or optical disk, can be coupled to the bus 405 to persistently store information and instructions. The storage device 425 can include or be part of the data repository 145.

The computing system 400 may be coupled via the bus 405 to a display 435, such as a liquid crystal display, or active matrix display, for displaying information to a user. An input device 430, such as a keyboard including alphanumeric and other keys, may be coupled to the bus 405 for communicating information and command selections to the processor 410. The input device 430 can include a touch screen display 435. The input device 430 can also include a cursor control, such as a mouse, a trackball, or cursor direction keys, for communicating direction information and command selections to the processor 410 and for controlling cursor movement on the display 435. The display 435 can be part of the data processing system 102, the client computing device 126 or other component of FIG. 1, for example.

The processes, systems and methods described herein can be implemented by the computing system 400 in response to the processor 410 executing an arrangement of instructions contained in main memory 415. Such instructions can be read into main memory 415 from another computer-readable medium, such as the storage device 425. Execution of the arrangement of instructions contained in main memory 415 causes the computing system 400 to perform the illustrative processes described herein. One or more processors in a multi-processing arrangement may also be employed to execute the instructions contained in main memory 415. Hard-wired circuitry can be used in place of or in combination with software instructions together with the systems and methods described herein. Systems and methods described herein are not limited to any specific combination of hardware circuitry and software.

Although an example computing system has been described in FIG. 4, the subject matter including the operations described in this specification can be implemented in other types of digital electronic circuitry, or in computer software, firmware, or hardware, including the structures disclosed in this specification and their structural equivalents, or in combinations of one or more of them.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The subject matter and the operations described in this specification can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more circuits of computer program instructions, encoded on one or more computer storage media for execution by, or to control the operation of, data processing apparatuses. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially generated propagated signal. The computer storage medium can also be, or be included in, one or more separate components or media (e.g., multiple CDs, disks, or other storage devices). The operations described in this specification can be implemented as operations performed by a data processing apparatus on data stored on one or more computer-readable storage devices or received from other sources.

The terms "data processing system" "computing device" "component" or "data processing apparatus" encompass various apparatuses, devices, and machines for processing data, including by way of example a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures. For example, the direct action API 108 or NLP component 106 and other data processing system 102 components can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program can correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 102) to perform actions by operating on input data and generating output. The processes and logic flows can also be performed by, and apparatuses can also be implemented as, special purpose logic circuitry, e.g., an FPGA (field programmable gate array) or an ASIC (application specific integrated circuit). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

The subject matter described herein can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject matter described in this specification, or a combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 101). The relationship of client and server arises by virtue of computer programs running on the respective computers and having a client-server relationship to each other. In some implementations, a server transmits data (e.g., data packets representing a digital component) to a client device (e.g., for purposes of displaying data to and receiving user input from a user interacting with the client device). Data generated at the client device (e.g., a result of the user interaction) can be received from the client device at the server (e.g., received by the data processing system 102 from the client computing device 126 or the 3P developer device 150).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the NLP component 106 or the direct action API 108, can be a single component, app, or program, or a logic device having one or more processing circuits, or part of one or more servers of the data processing system 102.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms. A reference to "at least one of 'A' and 'B'" can include only 'A', only 'B', as well as both 'A' and 'B'. Such references used in conjunction with "comprising" or other open terminology can include additional items.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. Scope of the systems and methods described herein is thus indicated by the appended claims, rather than the foregoing description, and changes that come within the meaning and range of equivalency of the claims are embraced therein.

What is claimed is:

1. A system for secure communication in mobile digital pages, comprising:
 a data processing system comprising at least one processor and memory;
 a validation component executed by the data processing system to:
  receive, from a third party developer device, an electronic document configured to interface with a runtime application programming interface;
  receive a digital component of a digital component placement campaign associated with the electronic document; and
  validate the electronic document based on a validation policy;
 a cache server to receive, from a viewer component executed by a client computing device, a request to access the electronic document, and provide, responsive to the request, the electronic document to cause the viewer component to:
  load, in a first iframe, the electronic document for display via the client computing device;
  load in a second iframe, the digital component;
  execute, in the electronic document, a runtime component to identify a tag coded with a markup language in the electronic document; and
  receive, from the runtime component via a secure communication channel, an indication of the tag;
 the data processing system to:
  select, based on the indication of the tag, a data value; and
  transmit, to the viewer component executed by the client computing device, the data value to cause the viewer component to:
   generate a prompt comprising the data value;
   receive, responsive to the prompt, input from the client computing device;
   provide, via the secure communication channel and responsive to the input, the data value to the runtime component to cause the runtime component to execute an action with the data value via the electronic document; and
   prevent the digital component from obtaining access to the data value.

2. The system of claim 1, comprising the data processing system to:
 parse the electronic document responsive to receipt of the electronic document from the third party developer device;
 determine, based on parsing the electronic document, that JavaScript is absent from the electronic document; and validate, responsive to the determination that JavaScript is absent from the electronic document, the electronic document for storage in the cache server of the data processing system.

3. The system of claim 1, comprising the data processing system to:
receive a second electronic document;
detect a presence of JavaScript in the second electronic document responsive to receipt of the second electronic document;
determine, responsive to detection of the presence of the JavaScript in the second electronic document, not to validate the second electronic document and remove the second electronic document from storage in the cache server.

4. The system of claim 1, comprising the data processing system to:
identify the markup language in the electronic document responsive to receipt of the electronic document from the third party developer device;
determine, based on a format of the markup language, that the electronic document is valid for secure communication in mobile digital pages; and
store, in the cache server, the electronic document responsive to validation of the electronic document for secure communication in mobile digital pages.

5. The system of claim 1, wherein the cache server comprises a proxy server for a server of the third party developer device that provided the electronic document.

6. The system of claim 1, comprising the cache server to:
intercept a request to access the electronic document;
perform a lookup in storage of the cache server to determine that the electronic document has been validated and stored in the cache server;
retrieve, from storage in the cache server, the electronic document instead of accessing a server of the third party developer device that provided the electronic document; and
transmit, from storage of the cache server, the electronic document to the viewer component executed by the client computing device.

7. The system of claim 1, comprising the data processing system to:
receive, from the viewer component interfacing with the runtime component via the secure communication channel, the indication of the tag;
retrieve, responsive to the tag, the data value from an account associated with the client computing device stored on the data processing system; and
provide, to the viewer component, the data value to cause the viewer component to generate the prompt including the data value.

8. The system of claim 1, comprising the data processing system to:
identify the data value responsive to receipt of the indication of the tag from the viewer component, the data value associated with the client computing device and stored on the data processing system; and
provide the data value to the viewer component to cause the viewer component to display, in an overlay, the prompt generated to include the data value.

9. The system of claim 1, comprising the data processing system to:
identify a plurality of candidate data values responsive to receipt of the indication of the tag from the viewer component; and provide the plurality of candidate data values for display in the prompt, wherein the prompt restricts access by the electronic document to at least one of the plurality of candidate data values.

10. The system of claim 1, wherein the viewer component blocks access to the data value by the electronic document prior to the input from the client computing device.

11. The system of claim 1, comprising the data processing system to:
search one or more electronic data sources associated with the client computing device to identify the data value responsive to the indication of the tag.

12. The system of claim 1, wherein the input comprises an instruction from the client computing device to grant the electronic document access to the data value provided by the data processing system responsive to the indication of the tag.

13. The system of claim 1, wherein the action comprises an electronic transaction using the data value.

14. A method of secure communication in mobile digital pages, comprising:
receiving, by a data processing system comprising at least one processor, from a third party developer device, an electronic document configured to interface with a runtime application programming interface;
receiving a digital component of a digital component placement campaign associated with the electronic document;
validating, by the data processing system, the electronic document based on a validation policy;
receiving, by a cache server from a viewer component executed by a client computing device, a request to access the electronic document, and provide, responsive to the request, the electronic document to cause the viewer component to:
load, in a first iframe, the electronic document for display via the client computing device;
load, in a second iframe, the digital component;
execute, in the electronic document, a runtime component to identify a tag coded with a markup language in the electronic document; and
receive, from the runtime component via a secure communication channel, an indication of the tag;
selecting, by the data processing system based on the indication of the tag, a data value;
transmitting, by the data processing system to the viewer component executed by the client computing device, the data value to cause the viewer component to:
generate a prompt comprising the data value;
receive, responsive to the prompt, input from the client computing device;
provide, via the secure communication channel and responsive to the input, the data value to the runtime component to cause the runtime component to execute an action with the data value via the electronic document; and
prevent the digital component from accessing the data value.

15. The method of claim 14, comprising:
parsing, by the data processing system, the electronic document responsive to receipt of the electronic document from the third party developer device;
determining, by the data processing system, based on parsing the electronic document, that JavaScript is absent from the electronic document; and
validating, by the data processing system, responsive to the determination that JavaScript is absent from the electronic document, the electronic document for storage in the cache server of the data processing system.

16. The method of claim 14, comprising:

receiving a second electronic document;

detecting a presence of JavaScript in the second electronic document responsive to receipt of the second electronic document;

determining, responsive to detection of the presence of the JavaScript in the second electronic document, not to validate the second electronic document and remove the second electronic document from storage in the cache server.

17. The method of claim 14, comprising:

identifying the markup language in the electronic document responsive to receipt of the electronic document from the third party developer device;

determining, based on a format of the markup language, that the electronic document is valid for secure communication in mobile digital pages; and storing, in the cache server, the electronic document responsive to validation of the electronic document for secure communication in mobile digital pages.

18. The method of claim 14, wherein the cache server is a proxy server for a server of the third party developer device that provided the electronic document.

19. The method of claim 14, comprising:

intercepting, by the data processing system, a request to access the electronic document;

performing a lookup in storage of the cache server to determine that the electronic document has been validated and stored in the cache server;

retrieving, from storage in the cache server, the electronic document instead of accessing a server of the third party developer device that provided the electronic document; and transmitting, from storage of the cache server, the electronic document to the viewer component executed by the client computing device.

20. The method of claim 14, comprising:

receiving, from the viewer component interfacing with the runtime component via the secure communication channel, the indication of the tag;

retrieving, responsive to the tag, the data value from an account associated with the client computing device stored on the data processing system; and providing, to the viewer component, the data value to cause the viewer component to generate the prompt including the data value.

* * * * *